(12) United States Patent
Streichardt

(10) Patent No.: US 11,160,375 B2
(45) Date of Patent: Nov. 2, 2021

(54) EDGE STRIP AND METHOD FOR ITS MANUFACTURE

(71) Applicant: Fritz EGGER GmbH & Co. OG, St. Johann in Tirol (AT)

(72) Inventor: Thomas Streichardt, Warendorf (DE)

(73) Assignee: FRITZ EGGER GmbH & Co. OG, St. Johann in Tirol (AT)

(\*) Notice: Subject to any disclaimer, the term of this patent is extended or adjusted under 35 U.S.C. 154(b) by 0 days.

(21) Appl. No.: 16/957,475

(22) PCT Filed: Nov. 6, 2019

(86) PCT No.: PCT/EP2019/080437
§ 371 (c)(1),
(2) Date: Jun. 24, 2020

(87) PCT Pub. No.: WO2020/094738
PCT Pub. Date: May 14, 2020

(65) Prior Publication Data
US 2021/0045533 A1 Feb. 18, 2021

(30) Foreign Application Priority Data

Nov. 6, 2018 (DE) ...................... 10 2018 127 657.5

(51) Int. Cl.
*A47B 96/04* (2006.01)
*A47B 96/20* (2006.01)
*B29L 31/44* (2006.01)

(52) U.S. Cl.
CPC .......... *A47B 96/201* (2013.01); *A47B 96/206* (2013.01); *B29L 2031/44* (2013.01)

(58) Field of Classification Search
CPC ................ A47B 96/201; A47B 96/206; A47B 2096/203; B29L 2031/44; B29L 2031/441
See application file for complete search history.

(56) References Cited

U.S. PATENT DOCUMENTS

| 2,367,124 A | * | 1/1945 | Hormes | ................. A47B 87/02 312/204 |
| 3,897,967 A | * | 8/1975 | Barenyi | ................. B60R 13/04 293/120 |

(Continued)

FOREIGN PATENT DOCUMENTS

| CN | 2592780 Y | 12/2003 |
| CN | 108430762 A | 8/2018 |

(Continued)

*Primary Examiner* — Matthew W Ing
(74) *Attorney, Agent, or Firm* — The Webb Law Firm

(57) ABSTRACT

An edge strip for pieces of furniture including a main body with an underside that can be attached to a piece of furniture and an upper side facing away from the underside, wherein the upper side has at least one transition section sloping down towards an edge of the main body. In order to enable an improved visual impression of the edge strip in the transition section, the transition section slopes down in a stepped manner towards the edge of the main body, wherein the transition section has at least two steps, each with an upper side surface and an edge side surface per step, wherein the upper side surfaces are aligned independently of one another in relation to the underside and wherein the edge side surfaces are inclined independently of one another in relation to the underside.

30 Claims, 9 Drawing Sheets

(56) References Cited

U.S. PATENT DOCUMENTS

| | | | | |
|---|---|---|---|---|
| 4,083,592 A | * | 4/1978 | Rubin | B60R 13/04 |
| | | | | 428/31 |
| 4,824,507 A | * | 4/1989 | D'Amico | B29C 70/345 |
| | | | | 156/245 |
| 4,882,821 A | * | 11/1989 | Sims, Jr. | A61G 17/034 |
| | | | | 27/17 |
| 5,989,657 A | * | 11/1999 | Wurz | A47B 95/04 |
| | | | | 428/31 |
| 2003/0205015 A1 | * | 11/2003 | Birmingham | E06B 3/74 |
| | | | | 52/455 |
| 2003/0222547 A1 | * | 12/2003 | Trees | A47B 77/00 |
| | | | | 312/204 |
| 2017/0156499 A1 | * | 6/2017 | Kane | A47B 96/20 |
| 2018/0297394 A1 | * | 10/2018 | Streichardt | B32B 27/36 |
| 2019/0075923 A1 | * | 3/2019 | Vangura | B32B 37/12 |
| 2020/0101694 A1 | * | 4/2020 | Vangura | B32B 7/12 |
| 2020/0187652 A1 | * | 6/2020 | Leng | B65D 65/403 |
| 2020/0397142 A1 | * | 12/2020 | Sampson | F16B 5/126 |

FOREIGN PATENT DOCUMENTS

| | | |
|---|---|---|
| DE | 8704099 U1 | 4/1987 |
| DE | 4208991 A1 | 9/1993 |
| DE | 29501605 U1 | 3/1995 |
| DE | 1970701594 A1 | 7/1998 |
| DE | 202004004329 U1 | 6/2004 |
| EP | 0733450 A1 | 9/1996 |
| EP | 1990206 A2 | 11/2008 |
| GB | 2200870 A | 8/1988 |
| WO | 2009053016 A1 | 4/2009 |

* cited by examiner

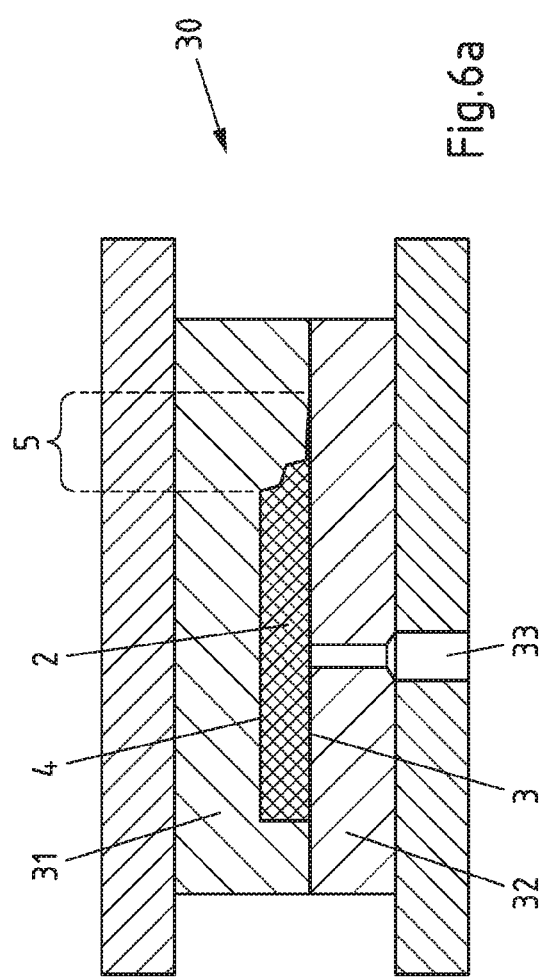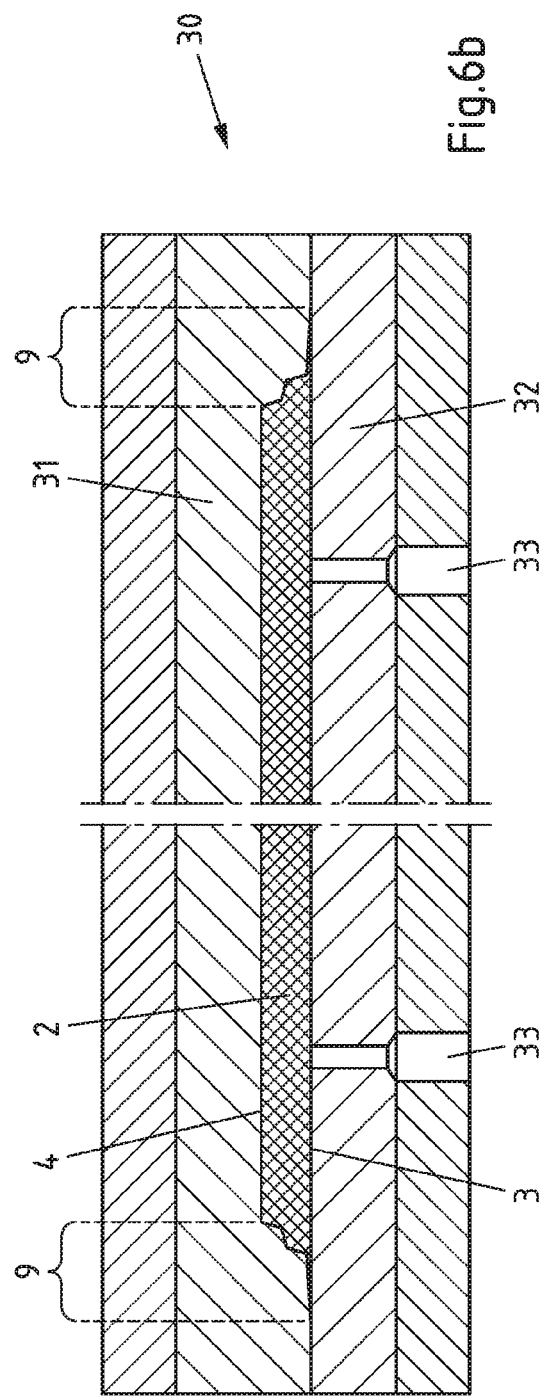

EDGE STRIP AND METHOD FOR ITS MANUFACTURE

CROSS-REFERENCE TO RELATED APPLICATIONS

This application is the United States national phase of International Application No. PCT/EP2019/080437 filed Nov. 6, 2019, and claims priority to German Patent Application No. 10 2018 127 657.5 filed Nov. 6, 2018, the disclosures of which are hereby incorporated by reference in their entirety.

BACKGROUND OF THE INVENTION

Field of the Invention

The present invention relates to an edge strip for pieces of furniture comprising a main body with an underside that can be attached to a piece of furniture and an upper side facing away from the underside, wherein the upper side has at least one transition section sloping down towards an edge of the main body.

The invention further relates to a method for the production of an edge strip according to the invention.

Description of the Related Art

Edge strips are known from the prior art which have a main body with a transition section sloping down towards an edge of the main body. Such edge strips are usually attached to the narrow sides of furniture panels as a decorative finish. A more visually appealing transition from the edge strip to the furniture panel is generated by the transition section of the edge strip sloping down towards the edge of the main body than the transition from an edge strip without a downwards sloping transition section.

WO 2009/053016 A1 describes a generic edge strip in the case of which the transition section has a decoration at least in sections. The edge strips of WO 2009/053016 A1 are, when manufactured, already made to the thickness dimension of the piece of furniture, whereby subsequent processing of the narrow side of the edge strip involving removing material is not required. An improved visual impression is intended to be generated by the decoration present in the downwards sloping transition section of the edge strip. However, the manufacture of the edge strip according to WO 2009/053016 A1 to the thickness dimension of the piece of furniture makes it difficult to compensate for differences in thickness within the tolerances of pieces of furniture such as furniture panels. In addition, exact positioning of the edge is difficult for these strips.

Decorations can be applied on edge strips in different manners. For example, a decoration can be applied by printing processes such as digital printing, in particular inkjet printing or gravure printing. A decoration can, however, also be applied by means of a printed film or by means of a transfer film. Of the mentioned printing processes, digital printing is the most flexible since special printing rollers are not required for each decoration and a film does not have to be created in a special method step which is applied as a decoration or from which the decoration is applied.

While a decoration can be applied on edge strips without a downwards sloping transition section with the aforementioned methods, applying a decoration on edge strips with a transition section sloping down towards an edge of the main body involves more significant technical requirements.

Therefore, it may be difficult in the case of contact-based printing processes, such as gravure printing, to maintain the contact over the entire surface of the downwards sloping transition section. In the case of printing processes that work with liquid colours such as gravure printing or inkjet printing, the colour can run in the downwards sloping transition section which may lead to the decoration appearing different in the transition section. Further, the decoration may appear uneven in the transition section since the increasingly more perpendicular surfaces in the transition section come into contact with relatively increasingly less colour. A decoration can also be applied on a downwards sloping transition section by means of films. However, an additional method step is necessary here in which the film or the transfer film is provided with the decoration or the decoration to be transferred, before the decoration is applied on the edge strip.

Due to the flexibility of digital printing, in particular inkjet printing, it would be desirable to be able to also use it to apply decorations on edge strips with a transition section sloping down towards an edge of the main body, wherein the edge strip overall has an appealing visual impression.

The object of the invention was therefore to provide an edge strip with a transition section sloping down towards an edge of the main body, which is further improved in regard to applying a decoration. A further object of the invention was to provide an edge strip which is further improved in regard to its visual properties.

SUMMARY OF THE INVENTION

All or some of these objects are achieved according to a first teaching of the present invention in the case of an edge strip for pieces of furniture, comprising a main body with an underside that can be attached to a piece of furniture and an upper side facing away from the underside, wherein the upper side has at least one transition section sloping down towards an edge of the main body, in that the transition section slopes down in the manner of steps towards the edge of the main body,
wherein the transition section has at least two steps each with an upper side surface and an edge side surface per step, wherein the upper side surfaces are aligned independently of one another in relation to the underside such that the smallest angles of the upper side surfaces in relation to the underside are each on average from −45° to 75°, in particular from −45° to 45° and wherein the edge side surfaces are inclined independently of one another in relation to the underside such that the smallest angles of the edge side surfaces in relation to the underside are each on average from 20° to less than 90°,
in particular from 46° to less than 90°, in particular up to 80°.

According to the invention, it is thus provided that the transition section slopes down in the manner of steps towards an edge of the main body. The transition section here has at least two steps each with an upper side and an edge side surface per step. The upper side surfaces here run parallel or inclined to the underside of the edge strip such that the smallest angles of the upper side surfaces in relation to the underside are each on average from −45° to 75°, in particular −45° to 45°. Similarly, the edge side surfaces are inclined in relation to the underside such that the smallest angles of the edge side surfaces in relation to the underside are each on average from 20° to less than 90°, in particular from 46° to less than 90°, in particular up to 80°.

In this case, the indicated angle range applies in each case for each upper side surface of a step. Furthermore, the indicated angle range applies in each case for each edge side surface of a step. The upper side surfaces can all have the same angle in the indicated angle range or different angles in each case. Similarly, the edge side surfaces can all have the same angle in the indicated angle range or different angles in each case.

The angles of the surfaces are measured in relation to the non-curved plane between the edges defining the underside of the main body.

A visually appealing transition from the edge strip to the piece of furniture is ensured by the presence of the transition section. It has now also been recognised that the step shape of the transition section allows greater flexibility with regard to the printing processes that can be used to apply a decoration on the edge strip including the transition section. As a result, the transition section can also be printed in an improved manner. In particular, the running of the applied print colours of the decoration can be reduced. Furthermore, the transition in the transition section can be designed more uniformly. This can in particular be achieved without for example the print heads having to be inclined when applying the decoration by means of inkjet printing. The visual impression of the edge strip is hereby improved.

The upper side of the edge strip can also have two transition sections sloping down towards opposing edges of the main body.

The upper side preferably has not only one or a plurality of transition sections. The width of a or the transition section is preferably 0.1 to 50%, more preferably 0.1 to 30%, even more preferably 0.1 to 20% and most preferably 0.1 to 10% of the total width of the upper side. The aforementioned percentage information relates here to an edge strip according to the invention which is applied in a finished manner to a piece of furniture and in the case of which all work steps were carried out including the processing in order to ensure a level finish of the edge with the piece of furniture. Before applying the edge strip, the width of the transition section can preferably be 0.1 to 90%, more preferably 0.1 to 70%, even more preferably 0.1 to 50%, even more preferably 0.1 to 30%, most preferably 0.1 to 20% of the total width of the upper side. Furthermore, the upper side of the edge strip is preferably substantially not stepped outside of the transition section.

The edge strip has a main body with an underside that can be attached to a piece of furniture. The underside here can preferably be attached to a narrow side of a piece of furniture. The narrow sides of furniture panels preferably resulted from sawing. The narrow sides of the furniture panel are preferably substantially flat.

According to one embodiment of the edge strip according to the invention, the edge strip can also have a pre-tensioning, in particular over the width of the edge strip. The pre-tensioning, in particular over the width of the edge strip, enables an adhesive layer, such as a glue layer, to be covered by the edge strip after applying the edge strip on a piece of furniture. The pre-tensioning of the edge strip over its width is expediently selected such that the edge has a concave shape with an arch of 0.3 mm or less, preferably of 0.05 to 0.25 mm. The aforementioned pre-tensioning has proven expedient in particular for edge strips with a width of up to 50 mm.

An inclination of the step surfaces in relation to the underside has proven advantageous. Therefore, it is provided according to the invention that the edge side surfaces of the steps do not run orthogonal as is common with steps, but rather inclined to the underside. The inclination of the edge side surfaces of the steps means they can be more easily provided with a decoration by means of different printing processes.

The upper side surfaces can run parallel to the underside or they can be inclined. If the smallest angles of the upper side surfaces in relation to the underside are each 0°, the upper side surfaces thus run parallel to the underside, thus the upper side surfaces can be effectively provided with a decoration. If the smallest angles of the upper side surfaces in relation to the underside are each more than 0° and up to 75°, in particular up to 45°, thus they can also be provided with a decoration. At the same time, steeper transition sections can be implemented. If the smallest angles of the upper side surfaces in relation to the underside are each less than 0° and up to −45° thus they can also be provided with a decoration. At the same time, a profile of the decoration over different steps can be avoided. The upper side surfaces are preferably inclined in relation to the underside such that the smallest angles of the upper side surfaces in relation to the underside are each on average from 10° to 45° or each from −10° to −45°.

Different configurations of the edge strip according to the invention and the method according to the invention for manufacturing the edge strip according to the invention are now described below, which are also subject matter of the dependent claims.

The upper side surfaces of the steps are aligned independently of one another such that the smallest angles of the upper side surfaces in relation to the underside are each on average from −45° to 75°, in particular up to 45°. Furthermore, the edge side surfaces of the steps are aligned independently of one another such that the smallest angles of the edge side surfaces in relation to the underside are each on average from 20° to less than 90°, in particular from 46° to less than 90°, in particular up to 80°.

It is conceivable that the upper side and edge side surfaces of the steps each run straight, in particular without any change of the angle in relation to the underside. It is also conceivable that the respective surfaces of the steps are configured such that individual sections of the surface of a step have different angles in relation to the underside, wherein the surface of the step, however, runs on average in the aforementioned angle ranges. Sections of the surface here can also be arranged with angles outside of the aforementioned ranges in relation to the underside. For example, an upper side surface can have a section which lies in the range of 0° to 45° in relation to the underside and have a further section which lies in the range of −1° to −45° in relation to the underside. Thus, for example a saucer structure of the steps can be implemented. The same applies for the edge side surfaces. The upper side and the edge side surfaces of the steps preferably each run straight.

The steps of the transition section can have a jagged shape. The steps of the transition section can also have a curled shape. Steps with a curled shape preferably have a wave peak. A wave trough is preferably between two consecutive steps with a curled shape. In the case of consecutive steps with a curled shape, the smallest angles of the steps with a curled shape are preferably measured in relation to the underside proceeding from the connection line from the highest point of the wave crest to the deepest point of the wave trough, for example the secant through these two points. In particular for the step height and the step width, the edge side surface and the upper side surface of a step with a curled shape can be defined accordingly by the planes that each contain these connection lines. It is clear to the person skilled in the art that for this purpose not all planes are considered that contain the respective connection line. Rather, the corresponding plane preferably contains over the length of the edge strip a plurality of connection lines of the same step with curled shape. The upper side surfaces are here preferably the surfaces that have the smaller smallest angles with respect to the underside. Steps of the transition section with curled shape can thus in particular be understood as steps that have bulged portions. For steps with a curled shape, the connection lines, for example the secants and therefore the smallest angles in particular can be determined in microscopic images of cross-sections of an edge strip. The deepest point of a wave trough is preferably the point at which two consecutive steps with curled shape contact each other. The highest point of a wave peak of a step with curled shape is preferably the point that has the greatest distance at right angles to the connection line between the deepest points of the two adjoining wave troughs.

It is also conceivable that one or a plurality of the steps has/have a jagged shape and one or a plurality of the steps has/have a curled shape. If a steps with a curled shape follows a step with a jagged shape or vice versa, the smallest angles of the step with curled shape are the measured in relation to the underside preferably proceeding from the connection line from the highest point of the wave peak to the transition point of the step with curled shape to the step with jagged shape. What has been said above for the steps with curled shape applies accordingly to the edge side and upper side surfaces. The highest point of the wave peak of the step with curled shape is in this case preferably the point that has the greatest distance at right angles to the connection line between the two adjoining transition points from the step with curled shape to the steps with jagged shape.

Steps with curled shape can for example result when the material adopts a curled shape when manufacturing an edge strip with steps with jagged shape after forming when cooled below its vicat softening temperature.

The transition section of the edge strip has at least two steps each with an upper side surface and an edge side surface per step. The transition section preferably has at least five steps, preferably at least twenty steps, more preferably at least fifty steps, more preferably at least eighty step, particularly preferably at least one hundred steps, each with an upper side surface and an edge side surface per step. A higher number of steps here allows the profile of the transition section to be designed smoother.

The first step of the transition section of the edge strip according to the invention begins at the edge of the edge strip. The last step of the transition section of the edge strip according to the invention ends at the non-sloping section of the upper side of the edge strip according to the invention. The last step can also have only one upper side surface that is inclined in particular in the range of 10° to 45° in relation to the underside.

The edge side surfaces of the steps of the transition section of the edge strip have in particular a length and a width. The lengths of the edge side surfaces of the steps of the transition section are predefined in particular by the length of the edge strip. The lengths of the edge side surfaces of the transition section are preferably identical. The widths of the edge side surfaces can be the same or different. The widths of the edge side surfaces of the transition section are preferably identical.

The upper side surfaces of the steps of the transition section of the edge strip have in particular a length and a width. The lengths of the upper side surfaces of the steps of the transition section are predefined in particular by the length of the edge strip. The lengths of the upper side surfaces of the transition section are preferably identical. The widths of the upper side surfaces can be the same or different. The upper side surface of the first step preferably has a greater width than the following step and/or the following steps.

Differences in the widths of the edge side surfaces among one another and the upper side surfaces among one another depend in particular on the desired profile of the transition section. Thus, it may be advantageous for straight profiles such as a chamfer when the edge side surfaces of the steps and the upper side surfaces of the steps following the first step have an identical width. In contrast, for a round profile of the transition section it may be advantageous when the widths of the edge side surfaces of the steps and the widths of the upper side surfaces of the steps following the first step are not identical.

In the edge strip according to the invention, the upper side surface of the first step particularly preferably extends up to the edge of the main body, wherein the length of the upper side surfaces of the steps is identical and is predefined by the length of the edge strip and wherein the upper side surface of the first step has a greater width than the upper side surface of the following step and/or the following steps. It is preferred here when the upper side surface of the first step does not run parallel to the underside of the edge strip, but rather is inclined in relation to the underside such that the smallest angles of the upper side surface of the first step in relation to the underside is on average from 10° to 45°. The first step particularly preferably forms a nose-shaped projection.

When the first step has a greater width than the following step(s), in particular by it forming a nose-shaped projection, it can protrude over the narrow side of a piece of furniture, even though the opposing edge of the edge strip lies flush with the edge of the narrow side of the piece of furniture. The protruding part of the projection can be removed in a downstream, material-removing step, wherein the predominant part of the edge strip advantageously remains unprocessed. The protrusion can in particular be separated when joining the edge strip to the furniture panel. The protrusion can be separated by means of mechanical processing such as milling or cutting, preferably with a scraper. The protrusion can also be separated by melting for example by means of laser, hot air or microwaves. Melting the protrusion can be used in particular for edge strips which have a functional layer. As a result, the predominant part of the decoration also remains intact in particular in the transition section. Therefore, due to the nose-shaped projection, the appearance of the edge of the edge strip remains substantially intact.

The greater width of the first step of the edge strip also offers the advantage that the thickness tolerances of the pieces of furniture, in particular the furniture panels, to which they are applied, can be laminated effectively. As a result, it is also easier to apply the edge strip according to the invention flush on the piece of furniture. An edge strip with two transition sections on opposing edges of the main body can be effectively adapted both to the upper side and to the underside of the furniture panel. As a result, higher tolerances are possible when applying the edge strip to the furniture panel.

The width of the upper side surface of the first step is preferably at least twice as great, in particular at least three times greater than the width of the upper side surface of the following step and/or the following steps. The width of the upper side surface of the first step is expediently 0.1 to 30 mm, preferably 0.1 to 15 mm, more preferably 0.1 to 10 mm, more preferably 0.1 to 5 mm, even more preferably 0.25 to 4 mm, particularly preferably 0.3 to 3 mm. Such widths represent a good compromise between a good appearance of the edge after applying and removing the protrusion and material consumption. In particular from a width of 0.1 to 5 mm, the mechanical post-processing is easier since the edge strip is more stable.

The width of the upper side surface of the step following the first step and/or the steps following the first step is preferably 0.01 to 1 mm, more preferably 0.01 to 0.5 mm, particularly preferably 0.01 to 0.2 mm.

Furthermore, the main body of the edge strip according to the invention can have at the transition from the upper side surface of the first step to the edge side surface of the first step a thickness of 0.01 to 3 mm, preferably of 0.05 to 1 mm, more preferably of 0.05 to 0.3 mm. The first step of the transition section therefore preferably has a low thickness. The first step or the nose-shaped projection of the edge strip is therefore thin. If the protruding part of the projection of the edge strip is now removed in a downstream material-removing step, only a very narrow region without a decoration is generated in the transition section. As a result, the predominant part of the decoration also remains intact in particular in the transition section. Therefore, due to the nose-shaped projection, the appearance of the edge of the edge strip remains substantially intact. As a result, the visual impression of the edge strip on the piece of furniture is improved.

The transition section of the edge strip according to the invention, in particular the upper side surfaces and the edge side surfaces, preferably has a roughness IL, measured according to DIN EN ISO 4287, in particular DIN EN ISO 4287:2010-07, from 1 to 10 μm, preferably from 3 to 8 μm or from 4 to 7 μm. As a result, the running of print colours can be reduced. Furthermore, it can be achieved that a printed-on decoration adheres better. Moreover, a more aesthetically appealing visual impression, in particular a so-called smooth-matte impression is achieved as a result.

The main body of the edge strip according to the invention can have different widths. The main body preferably has a width of 9 to 150 mm, preferably of 9 to 100 mm, more preferably of 9 to 85 mm, particularly preferably of 16 to 60 mm. Edge strips with a main body with one of the aforementioned widths can be applied to normal furniture panels.

The main body of the edge strip according to the invention can be made of different materials. The main body of the edge strip according to the invention preferably comprises at least one material which comprises a plastic or consists of one. Further preferably, the main body comprises at least one plastic. The plastic is preferably selected from the group consisting of acrylonitrile butadiene styrene copolymer, polyethylene, crosslinked polyethylene (PE-X), polypropylene, polyamide, poly vinyl chloride, polycarbonate, styrene butadiene, polyethylene terephthalate, poly methyl methacrylate, wood-plastic composite (WPC) and mixtures thereof. For wood-plastic composites, in particular compositions are considered that contain polypropylene and 50 to 90% by weight of wood fibres and/or wood flour, in relation to the total weight of the composition. These plastics have been found to be particularly suitable for manufacturing the edge strip according to the invention.

The main body of the edge strip according to the invention can be a single layer or multiple layers, in particular two or three layers. The main body can comprises a plurality of, in particular two or three layers. The layers can contain the same or different materials, preferably different materials. Multi-layered main bodies may be obtained by coextrusion. For example, the main body can have an upper and a lower layer which have different colours. The lower layer is preferably darker here than the upper layer. The upper layer can in particular be a decorative base. Furthermore, the main body can have an upper, a middle and a lower layer, wherein the lower layer comprises the underside of the main body and wherein an adhesion to a piece of furniture is achieved with the lower layer. The lower layer can in particular be a functional layer. As a functional layer, a layer is expediently considered by means of which the edge strip can be fastened to a furniture panel, in particular can be fastened in a materially-bonded manner, for example a melting layer or a melting adhesive layer. The upper layer can be a decorative base. The middle layer can be a layer which gives the edge strip stability. The lowermost layer, which contains the underside of the main body, preferably has a thickness of 0.05 to 3 mm, more preferably 0.1 to 1.5 mm, even more preferably 0.1 to 1 mm, even more preferably 0.1 to 0.5 mm, particularly preferably 0.1 to 0.4 mm.

The upper side of the main body of the edge strip according to the invention can have a decoration. In this case, the decoration can cover the upper side of the main body without the transition section. In this case, the upper side of the main body without the transition section is preferably covered completely or partially by the decoration.

The decoration can cover the upper side of the main body also only in the transition section. In this case, the upper side of the main body in the transition section is preferably covered completely by the decoration. Furthermore, the decoration can cover the upper side of the main body including the transition section. The upper side of the main body including the transition section is preferably covered by the decoration. The upper side of the main body including the transition section is particularly preferably completely covered by the decoration. In this case, the decoration on the upper side of the main body in the transition section can differ from the decoration on the upper side of the rest of the main body. A so-called end grain effect is hereby for example achieved. The decoration on the upper side of the main body including in the transition section can preferably be the same. As a result, the visual impression of the edge strip can be effectively configured. Furthermore, the edge strip can be adapted visually effectively to different pieces of furniture in this manner.

The decoration can be applied on the edge strip according to the invention in different ways. The decoration can for example be applied by gravure printing, in particular by indirect gravure printing, by screen printing, by flexographic printing, by dipping processes, in particular by cubic printing, by digital printing, in particular by inkjet printing, by applying a printed film or by means of a transfer film. The decoration is preferably printed on. The decoration is more preferably applied by digital printing. The decoration is particularly preferably applied by means of a contactless printing process, in particular by means of inkjet printing.

A primer can be applied on the upper side of the main body before the decoration is applied. A primer application may be helpful when the decoration is applied by means of print colours, in particular by gravure printing, screen printing, flexographic printing, digital printing or inkjet printing. The profile of print colours can be controlled better with the help of a primer. A primer can be applied here on the upper side of the main body only in the transition section. A primer can also be applied only on the upper side of the main body without the transition section. A primer can also be applied on the upper side of the main body including in the transition section. Where the primer is applied is in particular associated with where a decoration should be applied. The primer is preferably applied in the region of the upper side of the main body in which a decoration should be applied.

The edge strip according to the invention can also have a structure. The structure can here have a depth of up to 400 µm, preferably of 1 to 300 µm, more preferably from 10 to 200 µm, even more preferably from 15 to 100 µm. The upper side of the main body can have a structure only in the transition section. Similarly, the upper side of the main body can have a structure except for the transition section. Furthermore, the upper side of the main body including in the transition section can have a structure. In this case, the structure on the upper side of the main body in the transition section can differ from the structure on the upper side of the rest of the main body. Similarly, the structure on the upper side of the main body including in the transition section can preferably be the same. The structure can be formed by elevations and/or depressions. Elevations can in particular be applied by means of a structural varnish. Depressions can in particular be embossed. Alternatively, depressions can also be generated with the aid of a laser.

Furthermore, the edge strip according to the invention can be glossy. The upper side of the main body can have a gloss only in the transition section. Similarly, the upper side except for the transition section can have a gloss. Furthermore, the upper side of the main body including in the transition section can have a gloss. In this case, the gloss on the upper side of the main body in the transition section can differ from the gloss on the upper side of the rest of the main body. The gloss on the upper side of the main body including in the transition section can preferably be the same. The edge strip can also be matte instead of a gloss. For a matte edge strip, what has been said above for a glossy edge strip applies accordingly. The edge strip according to the invention can advantageously have all degrees of gloss, in particular from dull matte to high gloss. The edge strip can preferably have the degree of gloss in the previously described variations in relation to the uniformity on the upper side of the main body.

The main body of the edge strip according to the invention can also have at least one step-shaped depression transverse to the longitudinal direction. This step-shaped depression can for example be manufactured by embossing, by machining, by means of laser or with a medium jet, for example a water jet. The step-shaped depression preferably has a step profile, in particular on both sides of the step-shaped depression. The at least one step-shaped depression preferably has the same step profile, as a step groove described herein in connection with the second alternative of the method according to the invention with a step profile on both sides, but in the transverse direction of the main body. A plurality of step-shaped depressions in the main body are also conceivable. They can in particular have a determined distance from one another, for example in each case 60 cm or more. With such step-shaped depressions, in particular the corners of furniture panels can be designed to be visually appealing.

The edge strip can also have a step-shaped finish on the ends of the main body in the longitudinal direction in each case independently of one another. What has been said for the transition section applies accordingly for the shape of the step-shaped finish. The visual impression at the corners of a piece of furniture can be improved with the step-shaped finish based on the same principle as explained for the transition section.

According to a second teaching, the present invention also provides a method for manufacturing the edge strip according to the invention, in the case of which the main body of the edge strip comprising an underside and an upper side with the transition section is formed made of at least one material.

An edge strip according to the invention can be manufactured with the method according to the invention. Therefore, what has been said in each case for the edge strip according to the invention applies accordingly to the main body of the edge strip, in particular to the underside, the upper side, the transition section, the step shape of the transition section, the upper side surface of the first step, the upper side surfaces of the step(s) following the first step, the edge side surfaces and the main body and the at least one material.

The method according to the invention preferably comprises an extrusion step, in particular a coextrusion step. In this case, the main body can be directly extruded or coextruded. Furthermore, a precursor, for example a band, an edge band or a main body precursor can also be extruded or coextruded. The main body of the edge strip can also comprise one or a plurality of further materials, preferably one or a plurality of further plastics, in particular when the method comprises a coextrusion step. For example, the main body or the precursor, for example the band or the edge band, can have a decorative base. It is advantageously attached when manufacturing the edge strip, in particular coextruded as the uppermost layer of the main body or the precursor. As a result, colour uniformity can be ensured on the upper side including in the transition section. Furthermore, a functional layer and/or a colour layer can for example also be coextruded on the underside of the main body or of the precursor. What has been said for the functional layer of the edge strip according to the invention applies accordingly to the functional layer. It is also conceivable that different materials are coextruded in sections in a coextrusion step. For example, the transition section can be coextruded in material different to the rest of the edge strip. The same applies to a precursor of the main body.

The main body can be manufactured in a different manner in the method according to the invention. For example, the main body can be formed directly by profile extrusion. Furthermore, a band or an edge band can firstly be extruded which is processed in different manners. Lastly, the main body can also be formed by means of injection moulding. The formed main body can form the edge strip according to the invention, in particular an undecorated edge strip. Additionally however, a decoration and/or a structure and/or a varnish can also still be applied, in particular on the upper side. At least one decoration is preferably applied. Some alternative embodiments of the method according to the invention are described by way of example below.

Different manners are known to the person skilled in the art of manufacturing differences on the upper side in a decoration or in a varnish, for example differences in the decoration in the transition section from the rest of the upper side. For example, a plurality of print heads can be used for this purpose when applying a decoration or a varnish by means of inkjet printing. If a decoration or a varnish is applied by means of gravure printing or flexographic printing, a different visual impression can be achieved in the transition section to the rest of the upper side by using rubber rollers with different hardness.

According to a first preferred alternative of the method according to the invention, the main body is formed by profile extrusion. In this case, the main body is preferably formed from the melt. The main body comprising the transition section is formed directly according to this alternative.

According to the first alternative of the method according to the invention, the main body can be covered in particular on the upper side with a decoration. The decoration can for example be applied on the main body by gravure printing, in particular by indirect gravure printing, by flexographic printing, by dipping processes, in particular by cubic printing, by digital printing, in particular by inkjet printing, by applying a printed film or by means of a transfer film. The decoration is preferably printed on. The main body is preferably covered in particular on the upper side with a decoration by digital printing. What has been said above on the uniformity or difference of the decoration in the transition section and on the remaining upper side of the main body of the edge strip according to the invention applies accordingly to the method according to the invention.

A decoration can be applied with one or a plurality of print heads. The print head(s) can be inclined to enable better printing of the transition section. In this case, it is sufficient when some of the print heads are inclined.

In the first preferred alternative of the method according to the invention, the main body can be provided in particular on the upper side with a structure. A structure can be embossed into the main body, in particular on the upper side, in particular with an embossing roller. Furthermore, a structure can also be applied with a structuring film or a steel band or by means of laser or by mechanical machining. Alternatively or additionally, the main body in the first alternative of the method according to the invention can also be provided with a structure since a structural varnish is applied on the main body. In this manner, in particular raised structures can be obtained. Alternatively, raised structures can also be applied by means of a film. This may be advantageously carried out when a decoration is applied on the main body with a transfer film. Furthermore, a raised structure can also be applied with a 3D printer. What has been said above on the uniformity or difference of the structure in the transition section and on the remaining upper side of the main body of the edge strip according to the invention applies accordingly to the edge strip of the method according to the invention.

Furthermore, in the first preferred alternative of the method according to the invention, the gloss and/or the matteness of the edge strip can also be set. Glossy or matte edge strips can thus be manufactured. Gloss can be achieved in particular by applying a glossy varnish on the edge strip. What has been said above on the uniformity or difference of the gloss in the transition section and on the upper side of the remaining main body of the edge strip according to the invention applies accordingly to the edge strip in accordance with the method according to the invention.

According to second preferred alternative of the method according to the invention, the method preferably comprises the steps
 a. Manufacturing, in particular by means of extrusion or coextrusion, a band with a thickness, a longitudinal direction, an upper surface and a lower surface,
 b. Introducing, in particular, embossing, at least one step groove into the upper surface of the band whereby a grooved band is obtained,
 c. Separating, in particular cutting or tearing, the grooved band in the longitudinal direction, whereby at least one main body is formed,
wherein
the step groove has a step groove depth and a step-shaped cross-section which has on at least one side of the step groove at least two steps each with an upper side surface and an edge side surface per step, wherein the upper side surfaces are aligned independently of one another in relation to the lower surface such that the smallest angles of the upper side surfaces in relation to the lower surface are each on average from −45° to 45° and wherein the edge side surfaces are inclined independently of one another in relation to the lower surface such that the smallest angles of the edge side surfaces in relation to the lower surface are each on average from 46° to less than 90°, in particular up to 80° and wherein the step groove depth is at least 70%, preferably at least 80% of the thickness of the band.

The introduction of the at least one step groove can for example take place by milling or by embossing. The at least one step groove is preferably embossed.

Essentially, the second alternative of the method according to the invention has the advantage that a plurality of edge strips can be manufactured in one work process.

The band can be manufactured by extrusion. It is also conceivable to manufacture the band by means of coextrusion. If the band is manufactured by coextrusion, a decorative base can be coextruded on the upper side for example. A functional layer and/or a colour layer can for example be coextruded on the underside. What has been said for the functional layer of the edge strip according to the invention applies accordingly to the functional layer.

The step groove or the step grooves is/are preferably introduced into the band such that the grooved band at the deepest point of the step groove(s) has a thickness of 3 mm or less, preferably of 1 µm to 1 mm, more preferably of 10 µm to 500 µm, particularly preferably of 50 to 100 µm.

If the step groove is embossed, the band is expediently above its vicat softening temperature when embossed. The band is preferably present in the form of a melt, in particular in the form of a plastic melt when embossed. Melts, in particular plastic melts, have the advantage that they are more easily plastically deformable than objects in a fixed state of aggregation. Plastic melts in particular have the advantage that they can, however, effectively maintain form changes such as embossings in addition to their good plastic deformability. The grooved band is preferably cooled during or immediately after embossing, preferably below the vicat softening temperature of the material of the band. As a result, the embossed structure can be easily frozen.

The vicat softening temperature is preferably determined according to DIN EN ISO 306:2014-03, method B50 (force of 50 N, heating rate of 50 K/h).

Additionally, at least one straight groove is preferably introduced into the band in the second alternative of the method according to the invention, wherein the straight groove has a straight groove depth of at least 70%, preferably at least 80% of the thickness of the band and a straight profile. The straight groove preferably runs substantially parallel to the step groove. The introduction of the at least one straight groove can for example take place by milling or by embossing. The at least one straight groove is preferably embossed.

The straight groove or the straight grooves is/are preferably introduced into the band such that the grooved band at the deepest point of the straight groove(s) has a thickness of 3 mm or less, preferably of 1 µm to 1 mm, more preferably of 10 µm to 500 µm, particularly preferably of 50 to 100 µm.

In this case, the step groove depth and the straight groove depth can be selected independently of one another. However, the step groove depth and the straight groove depth preferably have the same value.

The distance between a step groove and an adjacent straight groove is preferably selected here such that it corresponds to the width of the edge strip according to the invention. The straight groove and the step groove have in the second alternative of the method according to the invention preferably a distance of 9 to 150 mm, more preferably of 9 to 100 mm, even more preferably of 9 to 85 mm, particularly preferably of 16 to 60 mm between one another.

As already explained, according to the second alternative of the method according to the invention, a plurality of edge strips can be manufactured in one work process. For example, a step groove can have the step profile on both sides of the step groove. Furthermore, at least 2, at least 5, at least 10 or at least 15 step grooves can also be introduced into the band. Advantageously, a plurality of straight grooves, in particular at least 2, at least 6, at least 11 or at least 16 straight grooves can also be introduced into the band. If more than one step groove and one straight groove are introduced, straight and step groove(s) preferably alternate over the width of the band, wherein one of the previously indicated distances is present in each case between a straight and a step groove independently of one another. The distances can be different. As a result, edge strips with identical an visual impression and different widths can be manufactured in one work process. As a result, edge strips with an identical visual impression for furniture panels of different widths can be manufactured in one work process.

The grooved band can for example be separated by means of cutting or tearing. Separating preferably takes place at the deepest introduced step(s) of the step groove(s), in particular along the line with the greatest step groove depth and/or on the introduced straight groove(s), in particular along the line with the greatest straight groove depth. Cutting can be carried out with a cutting device, for example a blade, a roller shear cut, a hot wire or a laser. More than one cutting device can be used.

The step-shaped cross-section of the step groove has according to the second preferred alternative of the method according to the invention on at least one side of the step groove at least two steps with an upper side and an edge side surface. The step-shaped cross-section of the step groove preferably has on at least one side of the step groove, at least five steps, in particular at least ten steps, preferably at least twenty steps, more preferably at least 50 steps, more preferably at least 80 steps, particularly preferably at least 100 steps, each with an upper side surface and an edge side surface per step. The step-shaped cross-section of the step groove can also have on both sides of the step groove in each case at least five, at least ten or at least twenty or at least 50 or at least 80 or at least 100 steps. If the step-shaped cross-section of the step groove has steps on both sides of the step groove, a plurality of edge strips can be manufactured in one work process virtually without any material loss, in particular when the band has the width of two edge strips. In this case, straight grooves do not have to be introduced into the band.

The edge side surfaces of the steps of the step groove in the second preferred alternative of the method according to the invention have in particular a length and a width. What has been said for the lengths and widths of the edge side surfaces of the steps of the edge strip according to the invention applies accordingly to the edge side surfaces of the steps of the step groove.

The upper side surfaces of the steps of the step groove in the second preferred alternative of the method according to the invention have in particular a length and a width. What has been said for the lengths of the upper side surfaces of the steps of the edge strip according to the invention applies accordingly to the upper side surfaces of the steps of the step groove. In particular what has been said for the width of the upper side surface of the first step of the edge strip according to the invention applies accordingly to the width of the upper side surface of the deepest introduced step. In this case, in particular the deepest step of the step groove corresponds to the first step of the edge strip according to the invention.

According to the second alternative of the method according to the invention, a decoration can be applied in a further step. A decoration can be applied on the band or on the grooved band in order to obtain a visually more appealing impression. A decoration is preferably applied on the grooved band. The decoration can be applied in different manners. The decoration can for example be applied by gravure printing, in particular by indirect gravure printing, by screen printing, by flexographic printing, by dipping processes, in particular by cubic printing, by digital printing, in particular by inkjet printing, by applying a printed film or by means of a transfer film. The decoration is preferably printed on. The decoration is more preferably applied by digital printing. The decoration is particularly preferably applied by means of a contactless printing process, in particular by means of inkjet printing. The decoration is applied here on the main body, on the band or on the grooved band in each case in particular on the upper side such that what has been said above on the uniformity or difference of the decoration in the transition section and on the upper side of the remaining main body of the edge strip according to the invention applies accordingly to the edge strips manufactured according to the second alternative of the method according to the invention. Although the decoration is preferably applied on the band or on the grooved band, it is also possible to apply the decoration on the edge profile.

According to the second preferred alternative of the method according to the invention, an edge strip with a structure can also be manufactured. An edge strip with structure can be obtained by imprinting, for example by embossing, the structure into the band or into the grooved band. If the step groove(s) and optionally the straight groove(s) is/are embossed, the structure can be embossed in particular at the same time as the step groove(s) and optionally the straight groove(s) is/are embossed. Furthermore, a structure can also be applied with a structuring film or a steel band or by means of laser or by mechanical machining. Alternatively or additionally, an edge strip with a structure can also be obtained since the grooved band or the formed main body is provided with a structural varnish. In this manner, in particular raised structures can be obtained. Alternatively, raised structures can also be applied by means of a film. This may be advantageously carried out when a decoration with a transfer film is applied on the band or on the grooved band. The structure is applied here on the main body, on the band or on the grooved band in each case in particular on the upper side such that what has been said above on the uniformity or difference of the structure in the transition section and on the upper side of the remaining main body of the edge strip according to the invention applies accordingly to the edge strips manufactured according to the second alternative of the method according to the invention.

Furthermore, in the second preferred alternative of the method according to the invention, the gloss of the edge strip can also be set. Glossy or matte edge strips can thus be manufactured. Gloss can be achieved in particular by applying a glossy varnish on the main body. Gloss can also be achieved by applying a glossy varnish on the band or the grooved band. The gloss is applied here on the main body, on the band or on the grooved band in each case in particular on the upper side such that what has been said above on the uniformity or difference of the gloss in the transition section and on the upper side of the remaining main body of the edge strip according to the invention applies accordingly to the edge strips manufactured according to the second alternative of the method according to the invention.

According to a third preferred alternative of the method according to the invention, edge strips according to the invention can also be obtained since an edge band is firstly extruded or coextruded which has no transition section. The edge band preferably has the width of the main body. A transition section can then be obtained by means of machining, in particular by milling, the edge band in order to form a main body.

Alternatively to machining, in particular milling, the edge band in order to form a main body, the edge band can also be thermally treated with the aid of a laser. A main body with a transition section can then be formed by this thermal treatment with the aid of a laser.

As a further alternative to machining, in particular milling, the edge band in order to form a main body, the edge band can also be treated with a medium jet, in particular a water jet. A transition section can be obtained by treatment with the medium jet, in particular the water jet.

What has been said for applying a decoration and/or a structure on the edge profile according to the first or second alternative of the method according to the invention applies accordingly to applying a decoration and/or a structure and/or gloss on the main body formed according to the third preferred alternative of the method according to the invention. A decoration and/or a structure and/or gloss are preferably applied according to the third preferred alternative on the main body. When applying decoration and/or structure and/or gloss on the edge band, which still has no transition section, they can in particular be removed in the region of the transition section.

According to a fourth alternative of the method according to the invention, the main body is formed by injection moulding. In this case, the tool used for the injection moulding can be designed such that the main body is provided with a structure during the injection moulding. According to this alternative of the method according to the invention, the main body is formed directly. The main body can form the edge strip or it can then be provided with a decoration, a structure and/or gloss in order to form the edge strip. Furthermore, a decorative film can also be laid into the injection moulding tool which is then back-injected. As a result, an edge strip with a decoration can be obtained directly during injection moulding. What has been said above in relation to the decoration, the structure and the gloss for the first, the second or the third embodiment of the method according to the invention in particular applies here accordingly. The injection moulding is suitable in particular for manufacturing the smallest volumes. A structure on the upper side can also be generated directly in the injection moulding tool during injection moulding.

At least one step-shaped depression can also be introduced into the main body or into the edge strip in the method according to the invention. The at least one step-shaped depression is preferably introduced into the main body before a decoration and/or a structure and/or gloss are applied.

The at least one step-shaped depression preferably has the same step profile, as a step groove described herein in connection with the second alternative of the method according to the invention, but it is oriented in the transverse direction. The at least one step-shaped depression can for example be manufactured by embossing, by machining, by means of laser or with a medium jet, for example a water jet. The at least one step-shaped depression can also be manufactured directly when manufacturing the edge strip by means of injection moulding. The at least one step-shaped depression is preferably introduced at regular intervals into the main body, for example every 60 cm or more. However, it is also conceivable that the step-shaped depression is introduced into the main body when the edge strip is cut to length on the piece of furniture. In this case, a decoration can also be applied on the main body only after attaching the edge strip to a furniture panel.

A step-shaped finish on the ends in the longitudinal direction of the main body can for example be implemented when manufacturing the main body or the edge strip by means of injection moulding.

Furthermore, the invention also provides an embossing roller by means of which according to the method according to the invention grooved bands, main bodies and/or edge strips can be manufactured in an embossing device with a preset roll gap, comprising a roller ball with a roller surface and at least one raised rib structure running on the roller surface to emboss at least one embossing into a band,
wherein the rib structure has a rib height and transverse to the circumferential direction of the roller ball a step-shaped cross-section, which has on at least one side of the rib structure at least two steps each with an upper side surface and an edge side surface per step, wherein the upper side surfaces are aligned independently of one another in relation to the roller surface such that the smallest angles of the upper side surfaces in relation to the roller surface are each on average from −45° to 75°, in particular from −45° to 45°, and wherein the edge side surfaces are inclined independently of one another in relation to the roller surface such that the smallest angles of the edge side surfaces in relation to the roller surface are each on average from 20° to less than 90°, in particular from 46° to less than 90°,
in particular up to 80° and with the height of the roll gap being measured from the roller surface and the rib height being at least 70% of the height of the roll gap.

The rib height can also be at least 80% of the height of the roll gap. The rib height is expediently selected such that a workpiece embossed with the roller, for example a grooved band, at the deepest embossing has a thickness of 3 mm or less, preferably of 1 μm to 1 mm, more preferably of 10 μm to 500 μm, particularly preferably of 50 to 100 μm. A cut-through device, for example a knife collar, which is advantageously arranged centrally on the rib structure in the circumferential direction, can provide support here. As a result, separating the grooved bands manufactured with the embossing roller can be facilitated.

What has been said for the upper side surface of the first step of the edge strip according to the invention applies accordingly to the upper side surface of the first step of the rib structure with step-shaped cross-section of the embossing roller according to the invention.

What has been said for the step(s) following the first step of the edge strip according to the invention applies accordingly to the upper side surfaces of the step(s), following the first step, of the rib structure with step-shaped cross-section of the embossing roller according to the invention.

What has been said for the edge side surfaces of the edge strip according to the invention applies accordingly to the edge side surfaces of the step(s), following the first step, of the rib structure with step-shaped cross-section of the embossing roller according to the invention.

The rib structure with step-shaped cross-section can have on one side or on both sides a step-shaped cross-section. The step-shaped cross-section can be identical on both sides or different on both sides.

The embossing roller can also have one or a plurality of further rib structures which have a substantially straight cross-section or a step cross-section.

The embossing roller can now be designed such that the rib structure(s) with step-shaped cross-section and optionally the rib structure(s) with straight cross-section are fixedly attached on the embossing roller. Edge strips with a fixed width can be manufactured with such an embossing roller. Edge strips with two transition sections arranged on opposing sides can accordingly be manufactured by adjacent rib structures with step-shaped cross-section arranged on the embossing roller.

It is also conceivable that embossing segments with different rib structure(s) with step-shaped cross-section and optionally with straight cross-section are applied, in particular pushed onto, a carrier roller which, together form the casing of the embossing roller. In addition to the embossing segments, spacers can also be applied on the carrier roller. As a result, the width of the edge strip(s) can be configured.

The embossing segments can for example be applied by pushing ring segments onto a carrier roller.

Additionally, the embossing roller can have embossing elements by means of which a structure can be embossed.

There are now a number of possibilities to design and further develop the edge strip according to the invention and the method according to the invention. In this regard, reference is made on the one hand to the claims following claims 1 and 17, on the other hand to the description of exemplary embodiments in conjunction with the drawings, in which:

DESCRIPTION OF THE INVENTION

Angles of the surfaces indicated below are indicated in relation to the non-curved plane between the edges defining the underside.

Figure 3A:
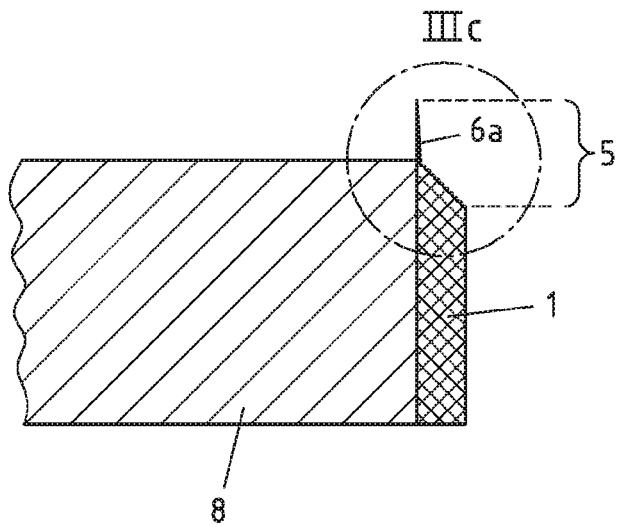
FIGS. 3a to 3c show a schematic representation of an edge strip according to the invention on a piece of furniture immediately after the edge strip has been attached to the piece of furniture (FIG. 3a) and immediately after the protruding part of the first step (FIG. 3b) has been removed and an enlargement of the position (FIG. 3c) circled in FIG. 3a, FIG. 4 shows a schematic representation of the manufacture of an edge strip according to the invention according to the first alternative of the method according to the invention by means of profile extrusion.
Figure 3B:
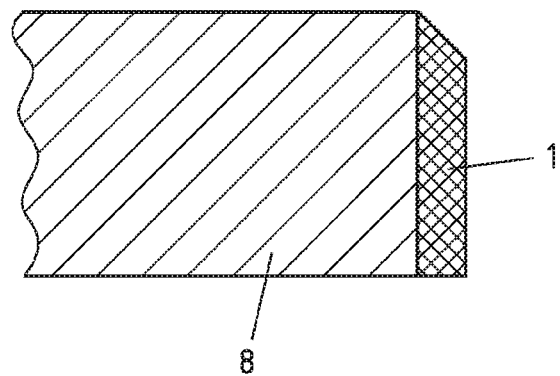
Figure 3C:
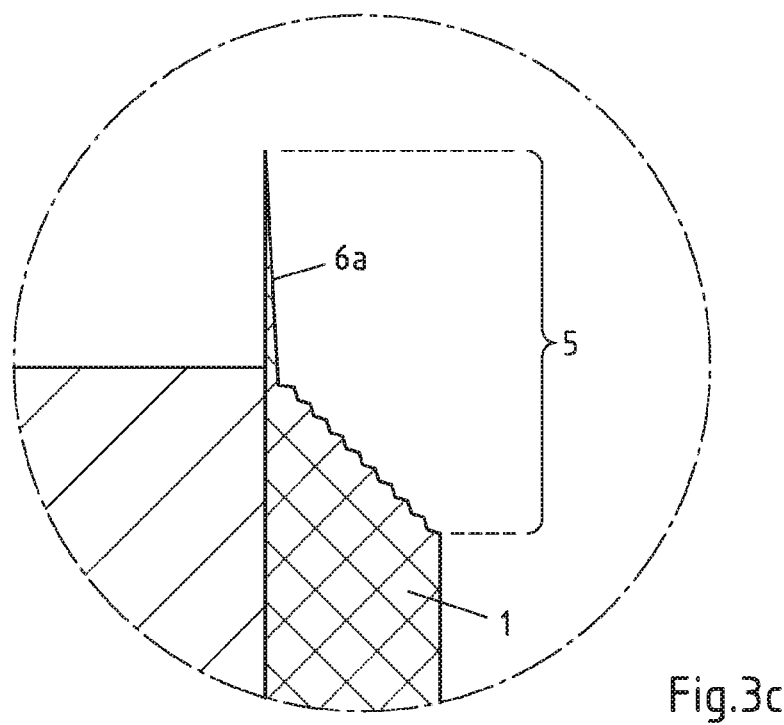
Figure 4:
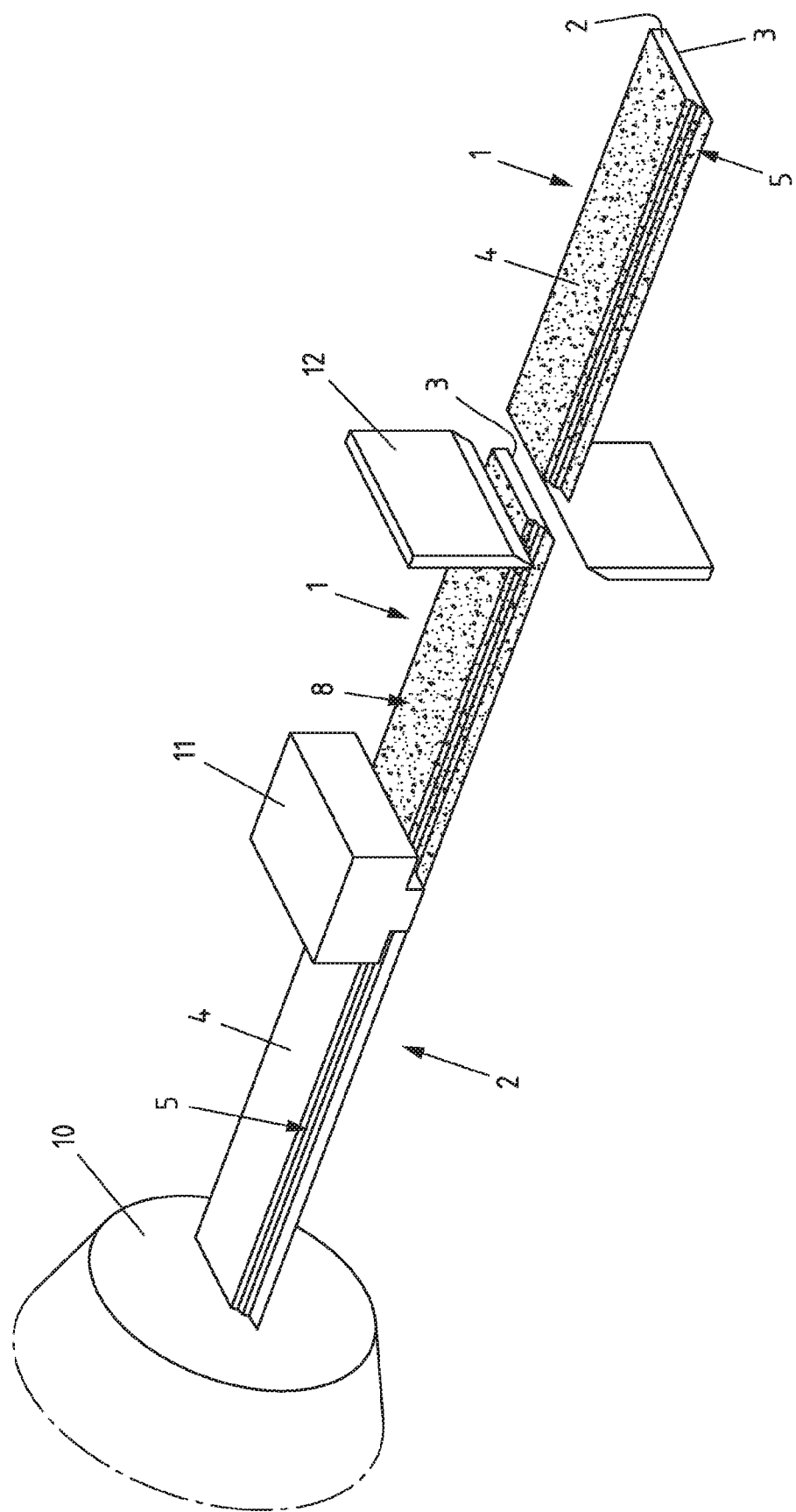
Figure 7:
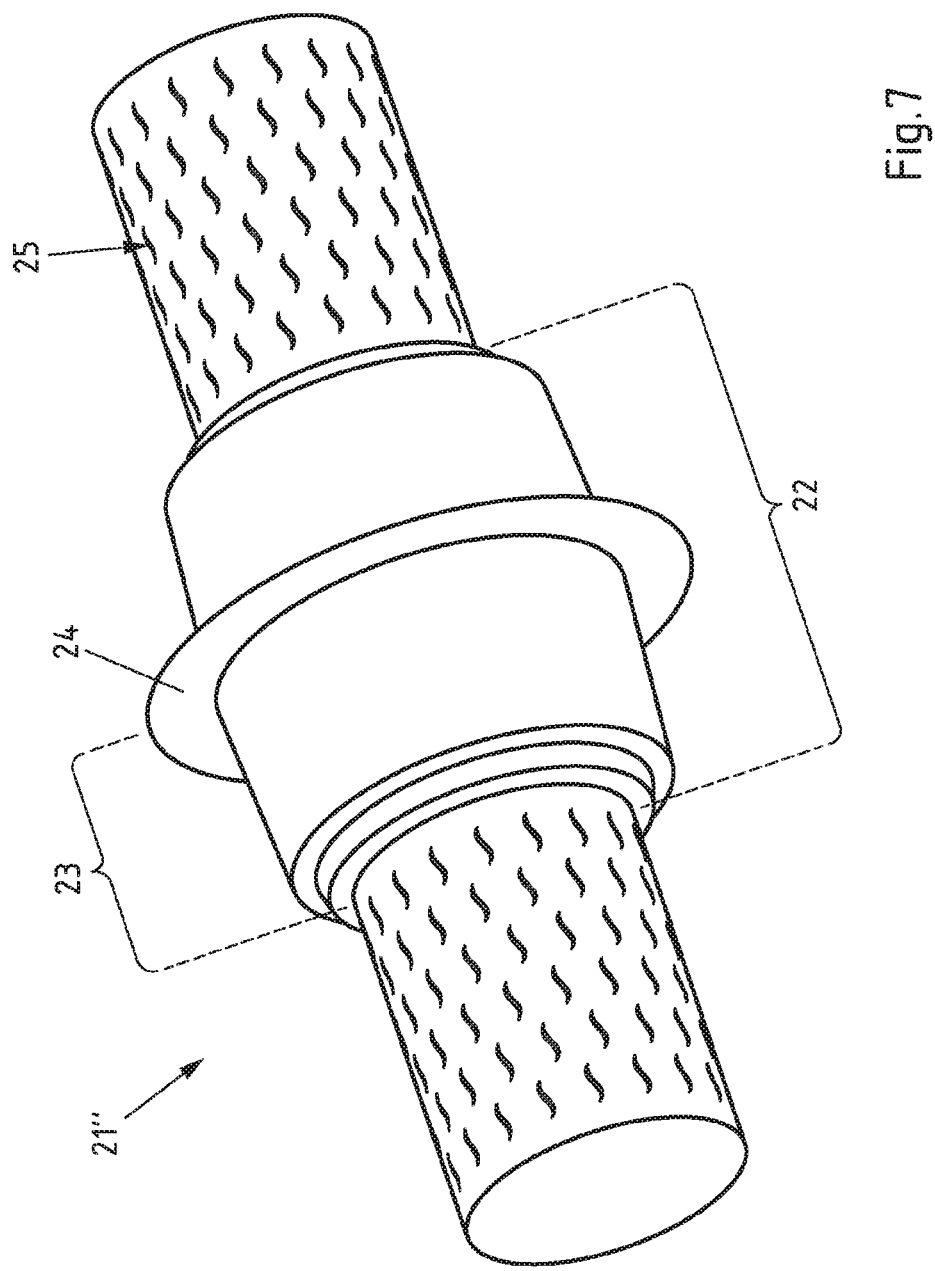
FIG. 7 shows a schematic representation of an embossing roller according to the invention, which has a knife collar arranged centrally on the rib structure in the circumferential direction.
Figure 8A:
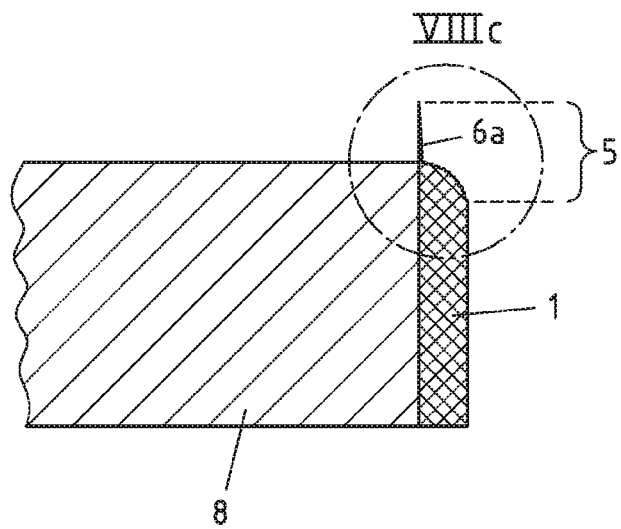
FIGS. 8a to 8c show a schematic representation of an edge strip according to the invention on a piece of furniture immediately after the edge strip has been attached to the piece of furniture (FIG. 8a) and immediately after the protruding part of the first step (FIG. 8b) has been removed and an enlargement of the position (FIG. 8c) circled in FIG. 8a. The edge strip in FIGS. 8a to 8c has in the transition section a rounded profile and no oblique profile.
Figure 8B:
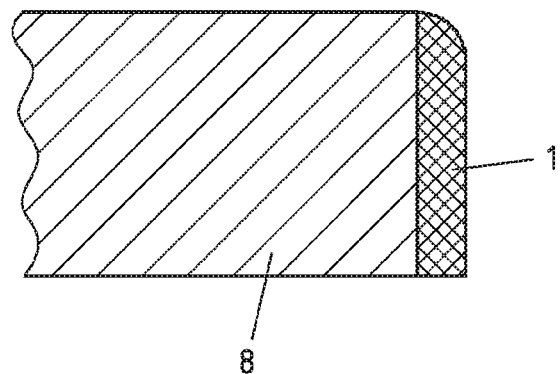
Figure 8C:
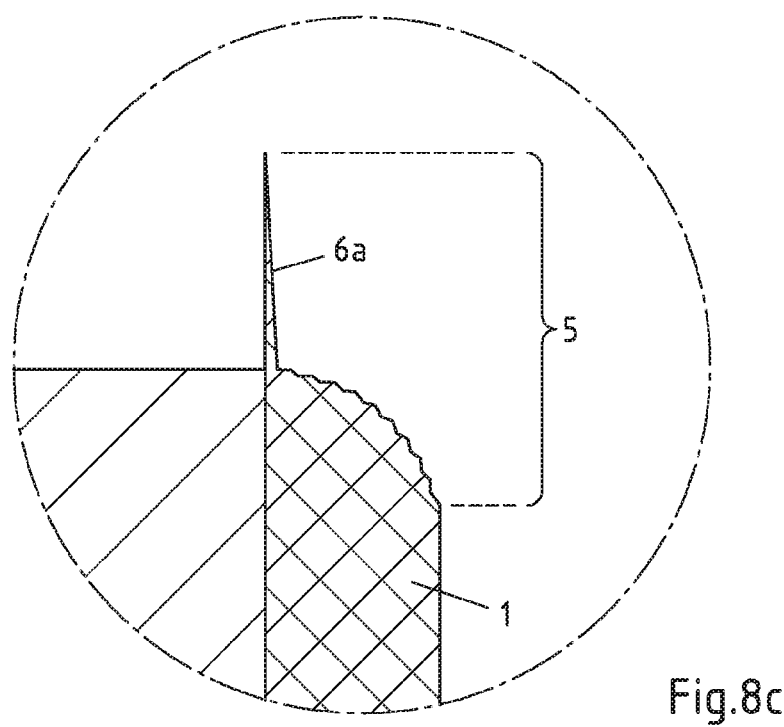
Figure 9A:
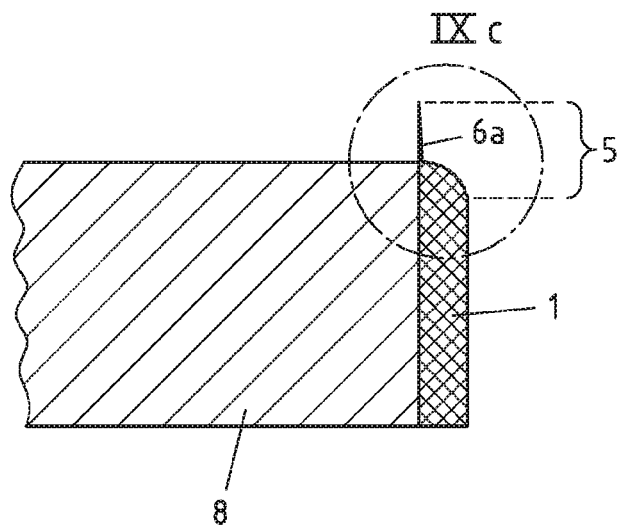
FIGS. 9a to 9c show a schematic representation of an edge strip according to the invention on a piece of furniture immediately after the edge strip has been attached to the piece of furniture (FIG. 9a) and immediately after the protruding part of the first step (FIG. 9b) has been removed and an enlargement of the position (FIG. 9c) circled in FIG. 9a. The edge strip in FIGS. 9a to 9c has in the transition section a rounded profile and no oblique profile. The edge strip also has steps with a curled shape.
Figure 9B:
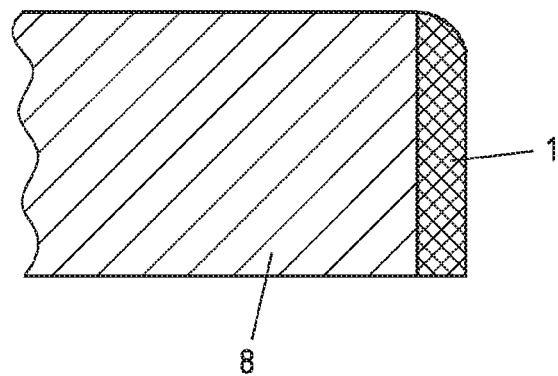
Figure 9C:
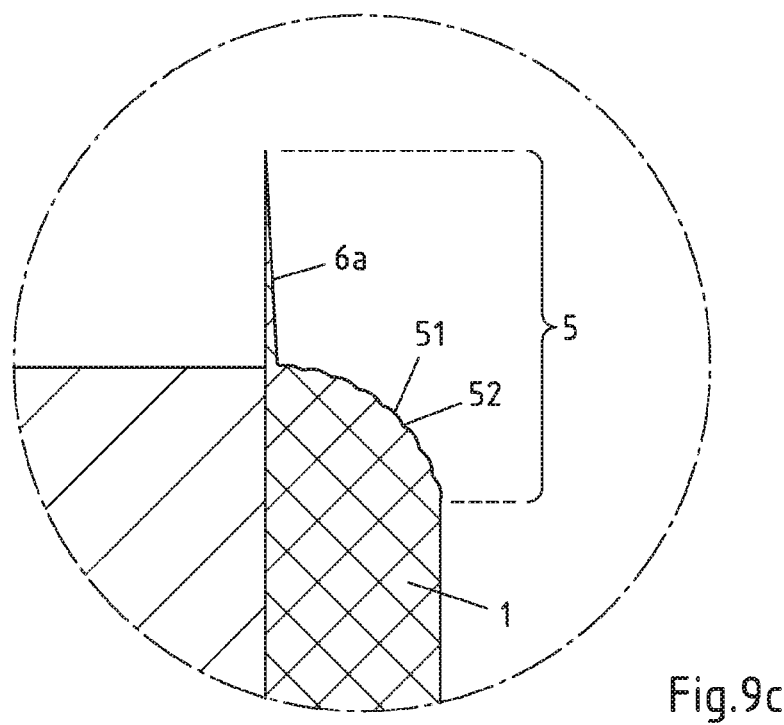

In FIGS. 1a to 1e and 2, preferred embodiments of the edge strips 1 and 1' are represented by way of example in side view and the edge strip 1 in three-dimensional representation, where the upper side surface of the first step is wider than the upper side surface of the following step(s). The FIGS. 3a to 3c show the preferred embodiment of the edge strip 1 of the FIGS. 1a to 1e and 2, where the upper side surface of the first step is also wider than the upper side surface of the following steps, but has a greater number of steps than the edge strip in FIGS. 1a to 1e and 2 and which is attached to a piece of furniture. FIGS. 4, 5 and 6 show different configurations of the method according to the invention. FIG. 7 shows an embossing roller according to the invention. FIGS. 8a to 8c show a variant of the edge strip of FIGS. 3a to 3c with rounded transition section 5. FIGS. 9a to 9c show a variant of the edge strip of FIGS. 8a to 8c where the steps have a curled shape. In the other figures, the steps have a jagged shape.

The exemplary embodiments of the edge strips 1, 1' are firstly explained below according to FIGS. 1a to 3c and 8a to 9c.

What is common to the edge strips 1, 1' of FIGS. 1a to 3c and 8a to 9c is that they have a main body 2 with an underside 3 and an upper side 4 facing away from the underside 3. The edge strips 1, 1' have a concave shape with an arch of 0.15 mm over their width.

Figure 1A:
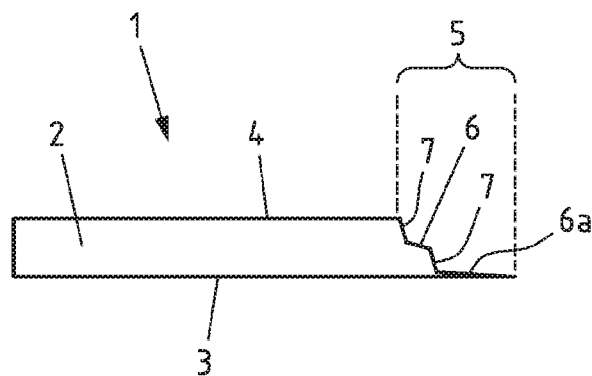
FIGS. 1a to 1e show schematic representations in side view of different configurations of the edge strip according to the invention with a transition section, wherein the upper side surface of the first step is wider in each configuration of the edge strip than the upper side surface of the following step(s)
Figure 1B:
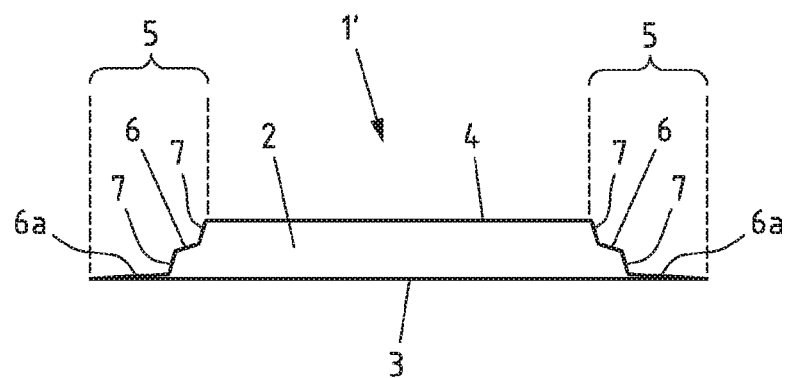

The upper side 4 also has at least one transition section 5 sloping down towards an edge of the main body 3. This is shown in FIGS. 1a, 1c, 1d, 2, 3a, 3b, 3c and 8a to 9c for the edge strip 1. It is, however, also conceivable that the upper side 4 has two transition sections 5 sloping down towards opposing edges of the main body 3, as shown in FIG. 1b for the edge strip 1'.

The edge strips 1, 1' of FIGS. 1a to 3c and 8a to 9c comprise a plastic. As plastics, acrylonitrile butadiene styrene copolymer, polyethylene, crosslinked polyethylene (PE-X), polypropylene, polyamide, poly vinyl chloride, polycarbonate, styrene butadiene, polyethylene terephthalate, poly methyl methacrylate, wood-plastic composite (WPC) and mixtures thereof are considered.

The upper side 4 of the edge strips 1, 1' in FIGS. 1a to 3c and 8a to 9c is completely covered with a decoration including in the transition section 5. The decoration has been printed on here by digital printing. The decoration is uniform over the surface 4 of the edge strip including in the transition region 5.

As can be discerned in FIGS. 1a to 1e and 2, the transition section 5 slopes in a step-like manner down towards the edge of the main body 2, wherein the transition section 5 has a plurality of steps, in particular a first step with an upper side surface 6a and an edge side surface 7 and at least one second step with an upper side surface 6 and an edge side surface 7. However, it is also conceivable that the transition section 5 comprises more than two steps, as represented in the FIGS. 3a to 3c and in the FIGS. 8a to 9c. The steps with curled shape are represented in the manner of a circular segment in FIGS. 9a to 9c. The length of the circular segment of the steps with curled shape is the same length in the FIGS. 9a to 9c. However, they can also be different lengths.

Figure 1C:
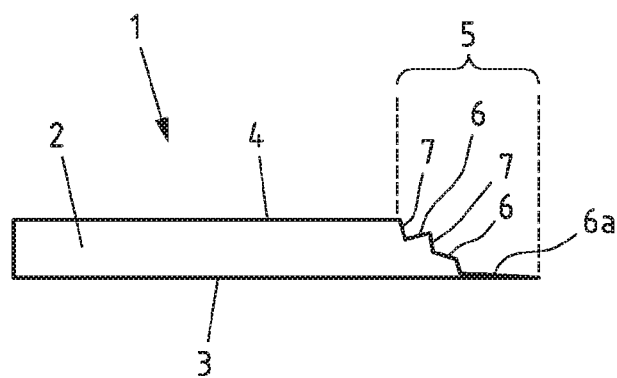
Figure 1D:
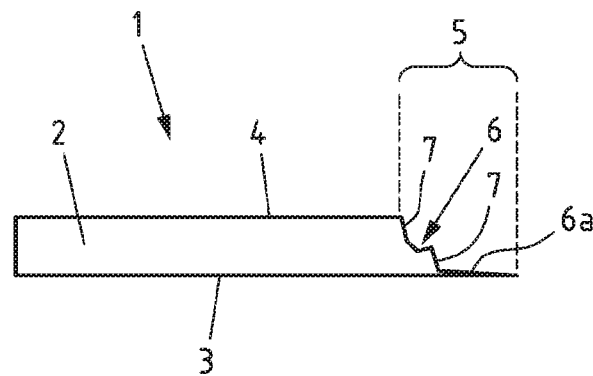
Figure 1E:
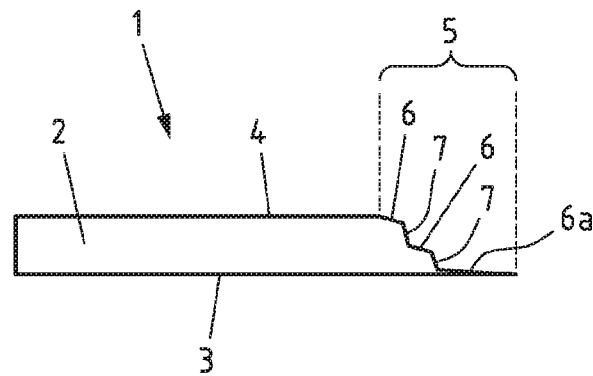
Figure 2:
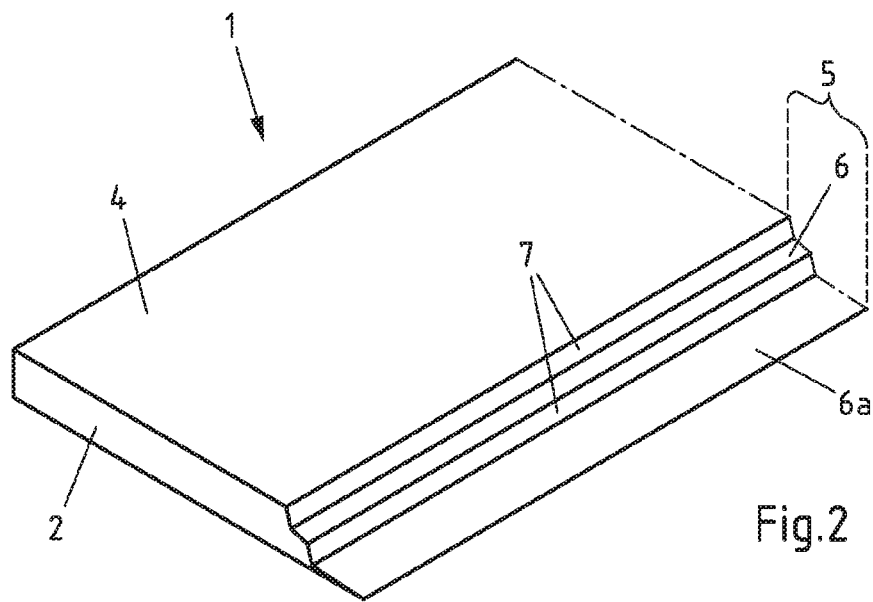
FIG. 2 shows a schematic representation of the edge strip according to the invention from FIG. 1a in a three-dimensional view.

The transition section ends in FIGS. 1a, 1c, 1d, 2, 3a, to 3c and 8a to 8c with an edge side surface 7. The transition section can, however, also end with an upper side surface 6 as shown in FIG. 1e. The transition section can also end with a step with curled shape, as shown in FIGS. 9a to 9c.

The upper side surface 6a of the first step is more than three times wider in the edge strips 1, 1' in the FIGS. 1a to 3a, 3c, 8a and 8c than the upper side surfaces 6 of the following steps. However, it is also conceivable that the upper side surface 6a of the first step is exactly as wide as the upper side surface(s) of the following step(s).

The inclinations of the upper side surfaces 6 and the edge side surfaces 7 of the steps with curled shape are defined in FIGS. 9a and 9c by the connection lines between the highest points of the wave peaks 51 and the deepest points of the wave troughs 52. In FIG. 9c, only one wave peak 51 and one wave trough 52 is in each case marked as an example. However, it is understood that in FIG. 9c a plurality of wave peaks 51 and wave troughs 52 are shown. In FIGS. 9a and 9c, the upper side surface 6a of the first step in the edge strip 1 is more than three times wider than the upper side surfaces 6 of the following steps. However, it is also conceivable that the upper side surface 6a of the first step is exactly as wide as the upper side surface(s) of the following step(s).

The edge strips 1, 1' in the FIGS. 1a to 3a, 3c, 8a, 8c, 9a and 9c are also thin at the transition from the upper side surface 6a of the first step to the edge side surface 7 of the first step. In particular, they have a thickness of 0.05 to 0.35 mm. As emerges from FIGS. 3a to 3c and 8a to 9c, manufacture-related differences in the thickness of the piece of furniture, to which the edge strip 1 is attached, can be easily balanced out with an edge strip 1, 1', where the upper side surface 6a is wider than the upper side surfaces 6 of the following steps. It is particularly advantageous that only the thin first step 6a has to be removed to adapt the edge strip 1 to be flush in FIGS. 3a, 8a and 9a. This is clear in FIGS. 3c, 8c and 9c which each show enlargements of the regions circled in FIG. 3a, 8a or 9a. In the case of the edge strip 1', which has two transition sections 5 sloping down towards opposing edges of the main body 3, two thin first steps must be removed to adapt so as to be flush. As a result, in the transition section 5 only a narrow section is generated without decoration, whereby the visual impression of the edge strips 1, 1' is not significantly changed. In addition, a substantially flowing transition from the edge strips 1, 1' to the piece of furniture is ensured. The edge strip 1' can be very precisely adapted so as to be flush on the upper and on the underside of the piece of furniture.

Furthermore, the upper side surfaces 6 and the edge side surfaces 7 of the steps following the first step have the same width in FIGS. 3a and 3b. As a result, the edge strip 1 has a chamfer in the transition section 5. The edge strip 1' accordingly has two chamfers. By varying the widths of the upper side surfaces 6 and the edge side surfaces 7 in the transition section 5 of the edge strips 1, 1', transition sections 5, in particular rounded and formed differently, can also be achieved.

An edge strip 1 with rounded transition section 5 on a furniture panel is shown in FIGS. 8a to 8c. The transition section 5 from FIG. 8a is represented enlarged in FIG. 8c. In the transition section 5 of the FIGS. 8a to 8c, the upper side surfaces 6 following the first step have partially different widths. Furthermore, the upper side surfaces 6, 6a and the edge side surfaces 7 have different inclinations. In this way, the rounded transition section 5 can be implemented. In this case, the edge side surfaces 7 are inclined such that the smallest angles of the edge side surfaces 7 in relation to the underside attached to the furniture panel are on average from 46° to less than 90°. The upper side surfaces 6, 6a are inclined in FIGS. 8a to 8c in relation to the underside such that the smallest angles of the upper side surface 6, 6a in relation to the underside 3 are each on average greater than 0° and smaller than 45°. Unlike FIG. 8a, FIG. 8b shows the edge strip 1 on the furniture panel after the protruding part of the first step has been removed.

In FIGS. 9a to 9c, a variant of the edge strip 1 from FIGS. 8a to 8c is shown with rounded transition section 5 on a furniture panel, wherein the steps of the transition section 5 have a curled shape. The steps with curled shape follow one another here. Each step with curled shape has a wave peak 51 which is shown in FIG. 9c by way of example for a step. One wave trough 52 is located between consecutive steps which is shown in FIG. 9c by way of example for one step. The deepest point of a wave trough 52 is preferably the point at which two consecutive steps with curled shape contact each other. The steps with curled shape are represented in the manner of circular segments in FIGS. 9a to 9c. The deepest point of a wave trough 52 in FIG. 9c is therefore preferably the point at which two circular segments contact one another. As described above, the smallest angles of the steps with curled shape are measured in relation to the underside in each case proceeding from the connection lines from the wave peaks 51 to the deepest points of the wave troughs 52.

The upper side surfaces 6, 6a are inclined in FIGS. 1a, 1b, 1e, 2, 3a, 3b and 3c in relation to the underside such that the smallest angles of the upper side surface 6, 6a in relation to the underside 3 are each on average greater than 0° and smaller than 45°. All upper side surfaces 6 have the same angle here. The number of the steps in the transition section 5 can be reduced by a stronger inclination of the upper side surfaces 6, 6a. In FIG. 1c, the upper side surfaces 6, 6a have different angles in relation to the underside 3. In this case, the angle of the upper side surface 6 of the second step is in a range of 10° to 45° and the angle of the upper side surface 6 of the third step is in a range of −10° to −45°. The angle of the upper side surface 6 of the second step changes in FIG. 1*d*, but is on average in a range of 5° to 45°. In this way, a saucer structure can be implemented which easily retains a printed-on decoration.

The edge side surfaces 7 are inclined in relation to the underside 3 such that the smallest angles of the edge side surfaces 7 in relation to the underside 3 are each on average from 46° to less than 90°, in particular up to 80°. They can be more easily printed with a decoration in digital printing processes, in particular in the inkjet printing process, through this inclination of the edge side surfaces 7.

The upper side surfaces 6, 6*a* and the edge side surfaces 7 also have in the FIGS. 1*a* to 3*c* and 8*a* to 8*c* a roughness of 10 µm. As a result, a gloss-matte impression of the edge strip is generated. The steps with curled shape have a roughness of 10 µm in the FIGS. 9*a* to 9*c*. As a result, a gloss-matte impression of this edge strip is generated.

The underside 3 of the edge strip 1 also has a layer in FIGS. 3*a* to 3*c* and FIGS. 8*a* to 9*c* which is kept a different colour, in particular darker than the colour of the main body 2. As a result, the colour difference between the processed first step and the decoration printed on the edge strip 1 is smaller. This can also be achieved by a multi-layered, in particular two-layered edge strip 1 where the layer containing the underside 3 is the darkest. The underside 3 also has a melting layer.

FIGS. 4, 5 and 6 show different configurations of the method according to the invention for manufacturing the edge strip 1 according to the invention. In all configurations, an edge strip 1 made of a material consisting of a plastic is manufactured here. The above-mentioned plastics can be considered here as possible plastics.

What is common to all configurations is that the main body 2 is formed from a plastic. The main body 2 is formed in the form of a continuous band. The formed main body 2 has an underside 3 here which can be attached to a piece of furniture, an upper side 4 facing away from the underside 3 and a transition section 5 sloping down towards an edge of the main body 2.

The transition section 5 of the formed main body 2 slopes in a step-like manner down towards the edge of the main body 2 and by way of example has at least two steps each with an upper side surface and an edge side surface per step, wherein the upper side surfaces are inclined independently of one another in relation to the underside 3 such that the smallest angles of the upper side surfaces in relation to the underside 3 are on average 20° in each case and wherein the edge side surfaces are inclined independently of one another in relation to the underside 3 such that the smallest angles of the edge side surfaces in relation to the underside 3 are each on average 75°.

In this case, for the possible configurations of the main body 2, in particular the transition section 5 and the upper side surface of the first step, reference is made above to the embodiments of the edge strip 1 according to the invention.

In FIG. 4, the main body 2 is now formed directly by profile extrusion with the extruder 10. What is advantageous for this configuration is that edge strips 1 can be hereby manufactured cost-effectively in small volumes.

This main body 2 is then provided with a decoration 8. In FIG. 4, the decoration 8 is applied by means of digital printing by the digital print head 11, preferably an inkjet print head. In this case, the digital print head 11 can also be inclined in order to be able to better print the transition section 5 of the main body 2. A plurality of print heads 11 with different inclination can also be used to achieve an optimal visual impression of the edge strip 1. The decoration 8 is uniform here on the upper side 4 of the main body 2 including in the transition section 5 and completely covers the upper side 4 of the main body 2 of the edge strip 1.

If desired, the main body 2 can be provided on the upper side 4, in addition to or instead of the decoration 8, with a structure. A structure can for example be embossed in the form of depressions by means of an embossing roller into the upper side 4 of the main body 2. Raised structures can be applied by means of structural varnish on the upper side 4 of the main body 2. To apply the structural varnish, a print head, for example a digital print head, can be used. It is also conceivable to apply raised structures by applying a structured film on the upper side 4 of the main body 2. The main body 2 is preferably also provided with a structure which is uniform on the upper side 4 of the main body of the edge strip 1 including in the transition section 5.

The edge strip 1 is cut in FIG. 4 by the cutting device 12 transverse to the extrusion direction at regular intervals. As a result, edge strips with the same length can for example be obtained. The edge strip 1 is rolled up for storage and transport (not shown).

Figures 5A, 5B:
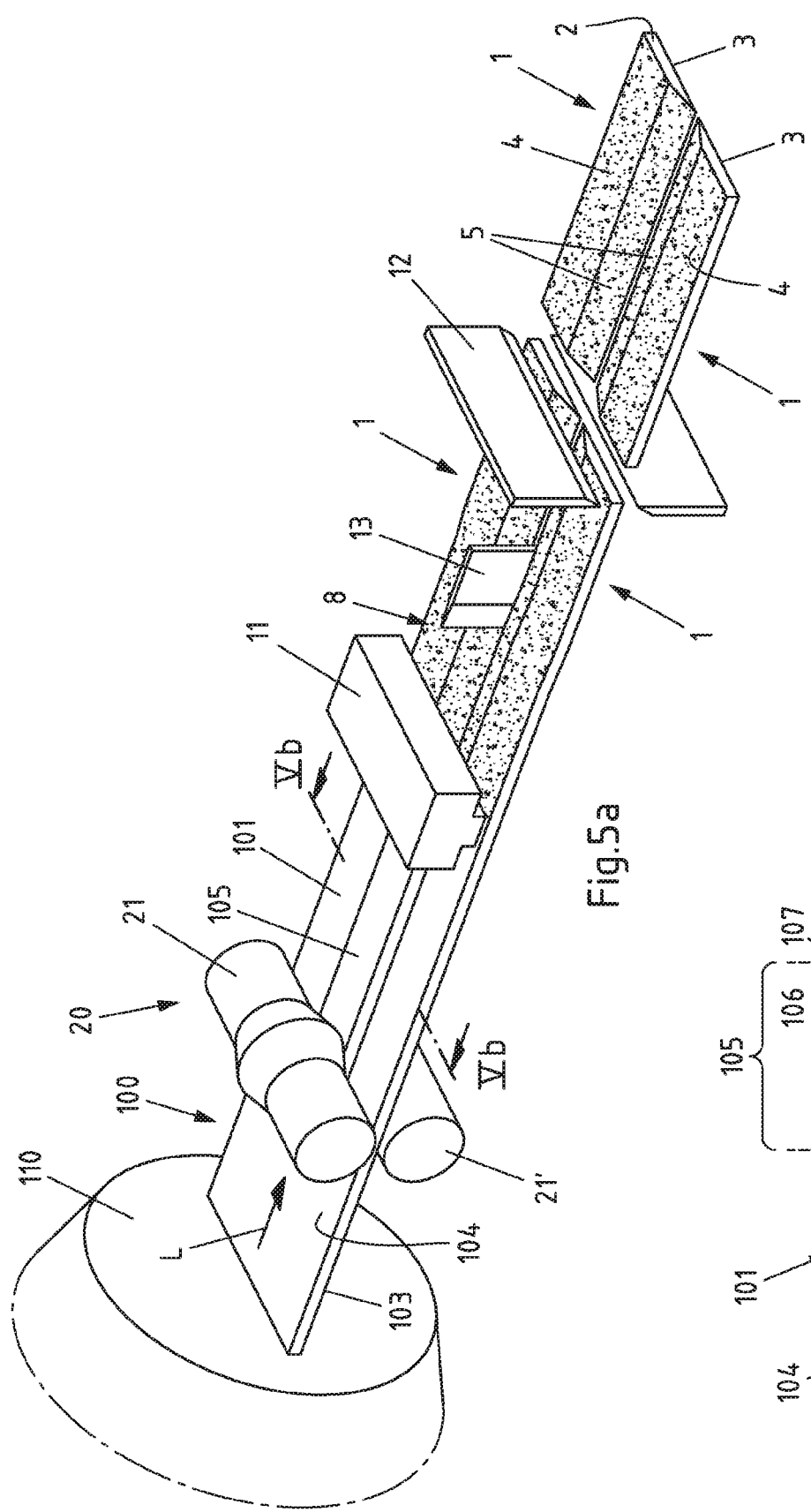
FIG. 5 shows a schematic representation of the manufacture of an edge strip according to the invention according to the 2nd alternative of the method according to the invention by means of embossing, FIGS. 6a and b show schematic representations of the manufacture of an edge strip according to the invention by means of injection moulding in two different cross-sections of the injection moulding tool, wherein the edge strip has at its ends in the longitudinal direction in each case a step-shaped finish.

In the alternative of the method according to the invention shown in FIGS. 5*a*, a band 100 is firstly manufactured which has a thickness, a longitudinal direction L, an upper surface 104 and a lower surface 103 formed from an extruder 110. A step groove 105 is then embossed in the embossing device 20 into the upper surface 104 of the band 100. To this end, the embossing device 20 is equipped with rollers 21 and 21'. Roller 21 is here an embossing roller which embosses the step groove 105 into the band 100. As a result, a grooved band 101 is obtained. The embossing device 20 can for example be designed as a calander.

The band 100 is extruded here in the form of a plastic melt which is at least on its upper surface 104 above its vicat softening temperature, measured according to DIN EN ISO 306:2014-03, process B50. The embossing roller 21 is cooled here. As a result, the grooved band 101 is cooled, whereby structures with very good dimensional accuracy can be embossed into the band 100. Advantageously, the grooved band 101 encloses the embossing roller 21 (not shown).

The step groove 105, which is embossed into the band 100, has a step groove depth and a step-shaped cross-section. In FIG. 5*a*, the cross-section of the step groove 105 has on both sides of the step groove 105 two steps each with an upper side surface 106, 106*a* and an edge side surface 107 per step, but is only represented in the form of two slopes. However, it is conceivable that the cross-section of the step groove 105 has steps only on one side of the step groove. However, more than one, in particular two, five, ten, fifteen or more step grooves 105 can be embossed into the band 100. In the embossing device, a structure, in addition to the step groove 105 and optional straight groove(s), can also be embossed into the band 100 (not shown).

A cross-section of the grooved band 101 along the plane Vb is outlined in FIG. 5*b*. In FIG. 5*b*, the cross-section of the step groove 105 has two steps on both sides. The upper side 106*a* of the deepest embossed step is 3 mm wide. The upper side 106 of the following step has a width of 0.05 mm. The upper side 106*a* is therefore wider than the upper side 106. The upper sides 106*a* and 106 have in relation to the lower surface 103 each on average an angle of 20°. The edge side surfaces 107 have in relation to the lower surface 103 an angle of 75°. However, it is conceivable that the cross-section has more steps, for example at least five, at least ten or at least twenty.

The step groove 105, which is embossed into the band 100, has a thickness of 0.1 mm at its thinnest point.

In addition to the step groove 105, one or a plurality of, in particular two, five, ten, fifteen or more straight grooves can also be embossed into the band 100 or into the grooved band 101 (not shown).

In FIG. 5a, a decoration is applied on the upper side of the grooved band 101 with the print head 11. The print head 11 is a digital print head, in particular an inkjet print head. The decoration is uniform here over the surface 104 of the grooved band 101. It is also conceivable that a structural and/or a gloss varnish is/are applied with further print heads (not shown). A plurality of print heads 11 can be used. They or some of them can also be inclined.

The grooved band 101 is then separated in FIG. 5a along the longitudinal direction L whereby two edge strips 1 with formed main bodies 2 are obtained. To this end, the cutting device 13 is used in FIG. 5a. The grooved band 101 is cut here on the step groove 105 along the line with the greatest step groove depth. Alternatively to cutting, the grooved band 101 can also be torn along step groove 105 in the longitudinal direction L. If the grooved band 101 has a plurality of step grooves 105 and optionally one or a plurality of straight grooves, then the grooved band 101 is cut in the cutting device 13 accordingly multiple times along its longitudinal direction. The cuts are made here along the straight grooves and along the step grooves 105.

In FIG. 5a, the formed edge strips 1 are finally cut in the cutting device 12 transverse to the longitudinal direction L at regular intervals. The edge strips 1 are then rolled up for storage and transport (not shown).

What is advantageous with the configuration according to FIG. 5a of the method according to the invention is that a plurality of edge strips 1 can be formed in one work process. The edge strips 1 are manufactured here with maximum usage of material.

According to a further configuration of the method according to the invention, not shown, a continuous edge band can also be extruded, which corresponds roughly to the band 100 of the configuration according to FIG. 5a, but is narrower and has roughly the width of an edge strip 1. An edge strip 1 with a transition section 5 can then be obtained by means of machining the edge band, for example by milling, by thermal treatment with a laser or with a medium jet, in particular a water jet. Alternatively, a transition section 5 can also be embossed into the edge band. For applying a decoration 8 and the further steps, reference is made to the embodiments for the configuration according to FIG. 4.

FIGS. 6a and 6b show a further configuration of the method according to the invention in which the main body 2 comprising an underside 3 and an upper side 4 and a transition section 5 is formed by injection moulding. The transition section 5 shown in FIG. 6a has two steps with a nose-shaped protrusion here. What has been said for the transition section 5 in FIG. 4 applies accordingly to the transition section 5.

In the alternative of the method according to the invention shown in FIGS. 6a and 6b, a plastic is injected into the tool 30 consisting of the partial moulds 31 and 32 via one or a plurality of injection nozzle(s) 33. After the plastic in the mould has cooled enough, the main body 2 thus obtained is removed from the tool 30. A decoration and optionally a gloss is then applied, as described above for FIG. 4 (not shown). As a result, edge strip 1 is obtained.

FIG. 6a shows a cross-section through the injection moulding tool 30, wherein the cut plane runs such that the longitudinal direction of the main body 2 is perpendicular on the cut plane. FIG. 6b shows a different cross-section through the same injection moulding tool 30, wherein the cut plane runs perpendicular to the cut plane of FIG. 6a and at the same time perpendicular to the surface 4 of the main body 2. It can also be seen in FIG. 6b that the upper side 4 of the main body 2 also slopes down in a step-like manner at the ends in the longitudinal direction of the main body 2 towards the edge and as a result forms the step-shaped finish 9. The shape of the step-shaped finish 9 is here exactly like the shape of the transition section 5.

The embossing roller 21, which is used in the embossing device 20, can be designed differently. What is common to the different configurations is that they have a raised rib structure running on the roller surface. The rib structure has a rib height and a step-shaped cross-section, which has on at least one side of the rib structure at least two steps each with an upper side surface and an edge side surface per step, wherein the upper side surfaces being aligned independently of one another in relation to the roller surface such that the smallest angles of the upper side surfaces in relation to the roller surface are each on average from −45° to 75°, in particular from −45° to 45° and wherein the edge side surfaces are inclined independently of one another in relation to the roller surface such that the smallest angles of the edge side surfaces in relation to the roller surface are on average from 20° to less than 90°, in particular from 46° to less than 90°, in particular up to 80°. The number of raised rib structures with step-shaped cross-section corresponds here to the number of step grooves which should be embossed into a band.

In order to also emboss straight grooves into a band, the embossing roller can additionally also accordingly have raised rib structures with straight cross-section. The number of rib structures with straight cross-section corresponds here to the number of straight grooves which should be embossed into a band.

FIG. 7 shows by way of example an embossing roller 21" which also has a knife collar 24 and embossing elements 25. The knife collar 24 is here arranged centrally in the circumferential direction on the rib structure 22. Due to the knife collar 24, the rib structure 22 has overall a height of at least 90% of the roll gap. In FIG. 7, the rib height is selected such that a workpiece embossed with the roller, for example a band, has a thickness of 50 μm at the deepest embossed point. The knife collar 24 is, however, not required. The rib structure 22 of the embossing roller 21" has on both sides a step-shaped cross-section 23, which is, however, marked only on one side in FIG. 7. The step-shaped cross-section of the rib structure 22 is identical on both sides and corresponds to the step-shaped cross-section 23. In FIG. 7, the rib structure with step-shaped cross-section of the embossing roller 21" by way of example has two steps. However, it is also conceivable that the rib structure with step-shaped cross-section of the embossing roller 21" has more steps. Furthermore, the embossing roller can be designed as described above for FIG. 5a.

The embossing roller 21" represented in FIG. 7 also has embossing elements 25. With the embossing elements 25, a structure can be embossed into a workpiece, for example a band, in the same work step in which a step groove is also embossed.

The invention claimed is:

1. An edge strip for pieces of furniture, comprising a main body with an underside that can be attached to a piece of furniture and an upper side facing away from the underside, wherein the upper side has at least one transition section sloping down towards an edge of the main body, characterised in that the transition section slopes down in a stepped manner towards the edge of the main body, wherein the transition section has at least two steps, each with an upper side surface and an edge side surface per step, wherein the upper side surfaces are aligned independently of one another in relation to the underside such that the smallest angles of the upper side surfaces in relation to the underside are each on average from −45° to 75°, and wherein the edge side surfaces are inclined independently of one another in relation to the underside such that the smallest angles of the edge side surfaces in relation to the underside are each on average from 20° to less than 90°.

2. The edge strip according to claim 1, characterised in that the transition section has at least five steps, each with an upper side surface and an edge side surface per step.

3. The edge strip according to claim 1, characterised in that the upper side surface of the first step extends up to the edge of the main body, wherein the length of the upper side surfaces of the steps is identical and is predefined by the length of the edge strip and wherein the upper side surface of the first step has a greater width than the upper side surface of at least the following step.

4. The edge strip according to claim 3, characterised in that the width of the upper side surface of the first step is at least two times greater than the width of the upper side surface of at least the following step.

5. The edge strip according to claim 3, characterised in that the width of the upper side surface of at least the step following the first step is from 0.01 to 1 mm.

6. The edge strip according to claim 3, characterised in that the main body has at the transition from the upper side surface of the first step to the edge side surface of the first step a thickness of 0.01 to 3 mm.

7. The edge strip according to claim 1, characterised in that the main body has a width of 9 to 150 mm.

8. The edge strip according to claim 1, characterised in that the main body of the edge strip comprises at least one material or consists of one that comprises at least one plastic, wherein the plastic is in particular selected from the group consisting of acrylonitrile butadiene styrene copolymer, polyethylene, crosslinked polyethylene (PE-X), polypropylene, polyamide, poly vinyl chloride, polycarbonate, styrene butadiene, polyethylene terephthalate, poly methyl methacrylate, or wood-plastic composite (WPC).

9. The edge strip according to claim 1, characterised in that the upper side of the main body including the transition section has a decoration or only the transition section has a decoration or the upper side of the main body without the transition section has a decoration.

10. The edge strip according to claim 9, characterised in that the decoration on the upper side of the main body in the transition section differs from the decoration on the upper side of the remaining main body.

11. The edge strip according to claim 9, characterised in that the decoration is printed.

12. The edge strip according to claim 1, characterised in that the upper side of the main body including the transition section has a structure or only the transition section has a structure or the upper side of the main body without the transition section has a structure and/or or in that the upper side of the main body including the transition section has a gloss or only the transition section has a gloss or the upper side of the main body without the transition section has a gloss.

13. The edge strip according to claim 12, characterised in that the structure has a depth of up to 400 μm and in that the structure is embossed or is a structural varnish.

14. The edge strip according to claim 1, characterised in that the main body of the edge strip has a plurality of layers.

15. The edge strip according to claim 14, characterised in that the main body of the edge strip comprises an upper layer, wherein the upper layer is a decorative base and in that the edge strip comprises a lower layer, wherein the lower layer comprises a functional layer.

16. A method for manufacturing an edge strip according to claim 1, wherein the main body comprising an underside and an upper side with a transition section is formed from at least one material.

17. The method according to claim 16, characterised in that the method comprises an extrusion step.

18. The method according to claim 16, characterised in that the main body is formed by profile extrusion of the at least one material.

19. The method according to claim 18, characterised in that a decoration is applied on the main body.

20. The method according to claim 16, comprising the steps of:
  a. Manufacturing by means of extrusion or coextrusion a band of the at least one material with a thickness, a longitudinal direction, an upper surface and a lower surface,
  b. Introducing at least one step groove into the upper surface of the band whereby a grooved band is obtained,
  c. Separating the grooved band in the longitudinal direction, whereby at least one main body is formed, wherein
    the step groove has a step groove depth and a step-shaped cross-section which has on at least one side of the step groove at least two steps each with an upper side surface and an edge side surface per step, wherein the upper side surfaces are aligned independently of one another in relation to the lower surface such that the smallest angles of the upper side surfaces in relation to the lower surface are each on average from −45° to 75° and wherein the edge side surfaces are inclined independently of one another in relation to the lower surface such that the smallest angles of the edge side surfaces in relation to the lower surface are each on average from 20° to 90° and wherein the step groove depth is at least 70% of the thickness of the band.

21. The method according to claim 20, characterised in that additionally at least one straight groove is introduced into the band, wherein the straight groove has a straight groove depth of at least 70% of the thickness of the band and a straight profile and in particular runs substantially parallel to the step groove.

22. The method according to claim 20, characterised in that the at least one step groove and the optional at least one straight groove are introduced by embossing.

23. The method according to claim 20, characterised in that the step-shaped cross-section of the step groove has on at least one side of the step groove at least five steps, each with an upper side surface and an edge side surface per step.

24. The method according to claim 20, characterised in that in each case a step groove and/or a straight groove have a distance of 9 to 150 mm between one another.

25. The method according to claim 20, characterised in that the length of the upper side surfaces is identical to the steps of the step-shaped cross-section and wherein the upper side surface of the deepest introduced step of the step-shaped cross-section has a greater width than the less deeply introduced step or the less deeply introduced steps.

26. The method according to claim 25, characterised in that the width of the upper side surface of the deepest introduced step is at least two times greater than the width of the upper side surface of the less deeply introduced step.

27. The method according to claim 20, characterised in that a decoration is applied on the grooved band.

28. An embossing roller for manufacturing edge strips in a method according to claim 20 in an embossing device with a preset roll gap, comprising a roller ball with a roller surface and at least one raised rib structure running on the roller surface to emboss at least one imprint into a band, characterised in that the rib structure has a rib height and transverse to the circumferential direction of the roller ball a step-shaped cross-section, which on at least one side of the rib structure has at least two steps each with an upper side surface and an edge side surface per step, wherein the upper side surfaces are aligned independently of one another in relation to the roller surface such that the smallest angles of the upper side surfaces in relation to the roller surface are each on average from −45° to 75° and wherein the edge side surfaces are inclined independently of one another in relation to the roller surface such that the smallest angles of the edge side surfaces in relation to the roller surface are each on average from 20° to less than 90°, and wherein the height of the roll gap is measured from the roller surface and the rib height is at least 70%, in particular at least 80% of the height of the roll gap.

29. The method according to claim 16, characterised in that an edge band is firstly extruded into which by means of milling, thermal treatment with a laser beam, with a medium jet such as a water jet or by means of embossing a transition section is incorporated such that a main body is formed.

30. The method according to claim 16, characterised in that the main body is formed by injection moulding.

* * * * *

UNITED STATES PATENT AND TRADEMARK OFFICE
CERTIFICATE OF CORRECTION

| | |
|---|---|
| PATENT NO. | : 11,160,375 B2 |
| APPLICATION NO. | : 16/957475 |
| DATED | : November 2, 2021 |
| INVENTOR(S) | : Thomas Streichardt |

Page 1 of 1

It is certified that error appears in the above-identified patent and that said Letters Patent is hereby corrected as shown below:

In the Claims

Column 25, Line 63, Claim 12, after "structure" delete "and/or"

Column 26, Line 53, Claim 21, after "and" delete "in particular"

Column 28, Lines 11-12, Claim 28, after "70%" delete ", in particular at least 80%"

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*